(12) United States Patent
Zahdeh

(10) Patent No.: US 10,040,335 B2
(45) Date of Patent: Aug. 7, 2018

(54) THERMAL MANAGEMENT SYSTEM FOR A VEHICLE, AND A METHOD OF CONTROLLING THE SAME

(71) Applicant: GM GLOBAL TECHNOLOGY OPERATIONS LLC, Detroit, MI (US)

(72) Inventor: Akram R. Zahdeh, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 331 days.

(21) Appl. No.: 15/079,597

(22) Filed: Mar. 24, 2016

(65) Prior Publication Data

US 2017/0274729 A1 Sep. 28, 2017

(51) Int. Cl.
| | |
|---|---|
| *B60H 1/03* | (2006.01) |
| *B60H 1/04* | (2006.01) |
| *B60H 1/02* | (2006.01) |
| *F01P 3/00* | (2006.01) |
| *B60H 1/00* | (2006.01) |
| *B60K 11/02* | (2006.01) |

(52) U.S. Cl.
CPC ......... *B60H 1/00492* (2013.01); *B60H 1/025* (2013.01); *B60H 1/03* (2013.01); *B60H 1/04* (2013.01); *B60K 11/02* (2013.01); *F01P 3/00* (2013.01); *B60H 2001/00942* (2013.01); *F01P 2060/02* (2013.01); *F01P 2060/08* (2013.01); *F01P 2060/12* (2013.01); *Y02T 10/166* (2013.01)

(58) Field of Classification Search
CPC ........... B60H 2001/00121; B60H 2001/00942; B60H 1/00492; B60H 4/025; B60H 1/03; B60H 1/04; F01P 3/00; F01P 2060/02; F01P 2060/08; F01P 2060/12; Y02Y 10/166
USPC ................................ 237/8 A, 12.3 B, 12.3 C
See application file for complete search history.

(56) References Cited

U.S. PATENT DOCUMENTS

| | | | | |
|---|---|---|---|---|
| 5,531,285 | A * | 7/1996 | Green ................... | B60H 1/004 123/142.5 E |
| 6,880,495 | B2 * | 4/2005 | Le Lievre .............. | F01P 7/167 123/41.1 |
| 7,011,049 | B2 * | 3/2006 | Tomasseli .............. | F01P 7/167 123/41.02 |
| 7,886,988 | B2 * | 2/2011 | Schwartz ............... | F01P 7/167 123/41.1 |

(Continued)

*Primary Examiner* — Gregory Huson
*Assistant Examiner* — Daniel E Namay
(74) *Attorney, Agent, or Firm* — Quinn IP Law

(57) ABSTRACT

A thermal management system for a vehicle may be selectively controlled to supply heat from any one of a plurality of different heat sources, to any one of a plurality of different heat sinks. The heat sources may include: an internal combustion engine, a cylinder head, an exhaust gas heat recovery system, an exhaust gas recirculation system, or a turbocharging system. The heat sinks may include: the internal combustion engine, the cylinder heat, an engine oil cooler, a transmission oil cooler, and a heating core. Each of an engine oil cooler control valve, a transmission oil cooler control valve, a heating core control valve, an engine block control valve, a cylinder head control valve, a bypass control valve, and a heat transfer control valve are controlled to effectuate a desired operating mode for the thermal management system.

20 Claims, 9 Drawing Sheets

(56) References Cited

U.S. PATENT DOCUMENTS

| | | | | |
|---|---|---|---|---|
| 9,745,888 | B2* | 8/2017 | Lee | F01P 7/165 |
| 2003/0145807 | A1* | 8/2003 | Tomasseli | F01P 7/167 |
| | | | | 123/41.31 |
| 2003/0177986 | A1* | 9/2003 | Le Lievre | F01P 7/167 |
| | | | | 123/41.31 |
| 2003/0196612 | A1* | 10/2003 | Le Lievre | F01P 7/167 |
| | | | | 123/41.1 |
| 2003/0196613 | A1* | 10/2003 | Tomasseli | F01P 7/167 |
| | | | | 123/41.31 |
| 2008/0087238 | A1* | 4/2008 | Held | F01P 7/165 |
| | | | | 123/41.48 |
| 2009/0078219 | A1* | 3/2009 | Marsh | F01P 1/06 |
| | | | | 123/41.02 |
| 2010/0139626 | A1* | 6/2010 | Raab | F01P 7/165 |
| | | | | 123/540 |
| 2011/0023796 | A1* | 2/2011 | Cattani | F01P 3/12 |
| | | | | 123/41.1 |
| 2011/0232590 | A1* | 9/2011 | Benet | F01P 3/02 |
| | | | | 123/41.09 |
| 2012/0137993 | A1* | 6/2012 | Kim | F01P 7/165 |
| | | | | 123/41.11 |
| 2013/0175022 | A1* | 7/2013 | King | B60H 1/00392 |
| | | | | 165/202 |
| 2013/0255598 | A1* | 10/2013 | McConville | F02B 29/0443 |
| | | | | 123/41.1 |
| 2013/0305708 | A1* | 11/2013 | Zahdeh | F01P 3/20 |
| | | | | 60/599 |
| 2016/0146092 | A1* | 5/2016 | Lee | F01P 7/16 |
| | | | | 123/41.1 |
| 2016/0169081 | A1* | 6/2016 | Hosokawa | F01P 7/16 |
| | | | | 123/41.08 |
| 2016/0273435 | A1* | 9/2016 | Hussain | F01N 5/02 |
| 2017/0297414 | A1* | 10/2017 | Beloe | B60H 1/00899 |

\* cited by examiner

THERMAL MANAGEMENT SYSTEM FOR A VEHICLE, AND A METHOD OF CONTROLLING THE SAME

TECHNICAL FIELD

The disclosure generally relates to a thermal management system for a vehicle, and a method of controlling the thermal management system.

BACKGROUND

Internal combustion engines produce heat during operation. Vehicles include a thermal management system that controls how the heat is used and/or removed. Thermal management systems generally include a coolant that circulates through the internal combustion engine. The coolant may further circulate through other components and/or systems of the vehicle, such as an exhaust gas heat recovery system, a turbocharging system, or an exhaust gas recirculation system. The coolant absorbs heat from these various different systems as it circulates through them. The heat stored in the coolant may be used for a vehicular purpose, such as heating a passenger compartment of a vehicle, or may be removed by circulating the heated coolant through a heat exchanger to dissipate the heat into the atmosphere.

SUMMARY

A thermal management system for a vehicle is provided. The thermal management system includes a pump having a pump inlet and a pump outlet. The pump is operable to circulate a coolant. A cold coolant gallery is disposed downstream of the pump, and is in fluid communication with the pump outlet for receiving the circulated coolant from the pump. The thermal management system includes at least one heat source that is disposed downstream of and in fluid communication with the cold coolant gallery. The heat source receives the circulated coolant from the cold coolant gallery. The at least one heat source is operable to transfer heat to the coolant circulating through the at least one heat source. A hot coolant gallery is disposed downstream of and in fluid communication with the at least one heat source. The hot coolant gallery is operable to receive the heated coolant from the at least one heat source. A heat exchanger is disposed in fluid communication with the hot coolant gallery and the pump inlet. The heat exchanger is operable to remove heat from the coolant as the coolant is circulated through the heat exchanger. A bypass loop interconnects the hot coolant gallery and the pump inlet, and bypasses the heat exchanger. An Engine Oil Cooler (EOC) includes an EOC inlet and an EOC outlet. The EOC inlet is disposed in fluid communication with each of the cold coolant gallery and the hot coolant gallery. The EOC outlet is disposed in fluid communication with the bypass loop. An EOC control valve interconnects the EOC inlet, the cold coolant gallery, and the hot coolant gallery. The EOC control valve is operable to supply the EOC inlet with the coolant from the cold coolant gallery, to supply the EOC inlet with the coolant from the hot coolant gallery, or to supply the EOC inlet with the coolant from both the cold coolant gallery and the hot coolant gallery. The EOC control valve is also operable to close fluid communication between the EOC inlet and both the cold coolant gallery and the hot coolant gallery. A Transmission Oil Cooler (TOC) includes a TOC inlet and a TOC outlet. The TOC inlet is disposed in fluid communication with each of the cold coolant gallery and the hot coolant gallery. The TOC outlet is disposed in fluid communication with the bypass loop. A TOC control valve interconnects the TOC inlet, the cold coolant gallery, and the hot coolant gallery. The TOC control valve is operable to supply the TOC inlet with the coolant from the cold coolant gallery, to supply the TOC inlet with the coolant from the hot coolant gallery, or to supply the TOC inlet with the coolant from both the cold coolant gallery and the hot coolant gallery. The TOC control valve is also operable to close fluid communication between the TOC inlet and both the cold coolant gallery and the hot coolant gallery. A Heating Core (HC) includes a HC inlet and a HC outlet. The HC inlet is disposed in fluid communication with the hot coolant gallery. The HC outlet is disposed in fluid communication with the bypass loop. A HC control valve interconnects the HC inlet and the hot coolant gallery. The HC control valve is operable to supply the HC inlet with the coolant from the hot coolant gallery, and is operable to close fluid communication between the HC inlet and the hot coolant gallery.

A method of controlling a thermal management system of a vehicle is also provided. The thermal management system includes a pump having a pump inlet and a pump outlet. The pump is operable to circulate a coolant through the thermal management system. A cold coolant gallery is disposed downstream of the pump, and is in fluid communication with the pump outlet for receiving the circulated coolant from the pump. At least one heat source is disposed downstream of and in fluid communication with the cold coolant gallery. The at least one heat source receives the circulated coolant from the cold coolant gallery, and is operable to transfer heat to the coolant circulating therethrough. A hot coolant gallery is disposed downstream of and in fluid communication with the at least one heat source, and is operable to receive the heated coolant from the at least one heat source. The at least one heat source includes an internal combustion engine, a cylinder head attached to the internal combustion engine, and at least one of an exhaust gas heat recovery system, an exhaust gas recirculation system, or a turbocharging system. The engine block includes an engine block inlet and an engine block outlet, with the engine block inlet disposed in fluid communication with the cold coolant gallery for receiving the coolant, and with the engine block outlet disposed in fluid communication with the hot coolant gallery for supplying heated coolant to the hot coolant gallery. A block control valve interconnects the engine block outlet and the hot coolant gallery. The block control valve is operable to open fluid communication and close fluid communication between the engine block outlet and the hot coolant gallery. The cylinder head is disposed in fluid communication with the engine block inlet, and includes a head outlet disposed in fluid communication with the hot coolant gallery. A head control valve interconnects the head outlet and the hot coolant gallery. The head control valve is operable to open fluid communication and close fluid communication between the head outlet and the hot coolant gallery. A heat exchanger is disposed in fluid communication with the hot coolant gallery and the pump inlet. The heat exchanger is operable to remove heat from the coolant as the coolant is circulated through the heat exchanger. A heat transfer control valve interconnects the hot coolant gallery and the heat exchanger. The heat transfer control valve is operable to open fluid communication and close fluid communication between the hot coolant gallery and the heat exchanger. A bypass loop interconnects the hot coolant gallery and the pump inlet, thereby bypassing the heat exchanger. A bypass control valve interconnects the hot coolant gallery and the bypass loop. The bypass control valve is operable to open fluid communication and close fluid communication between the hot coolant gallery and the bypass loop. An Engine Oil Cooler (EOC) includes an EOC inlet and an EOC outlet. The EOC inlet is disposed in fluid communication with each of the cold coolant gallery and the hot coolant gallery. The EOC outlet is disposed in fluid communication with the bypass loop. An EOC control valve interconnects the EOC inlet, the cold coolant gallery, and the hot coolant gallery. The EOC control valve is operable to supply the EOC inlet with the coolant from the cold coolant gallery, to supply the EOC inlet with the coolant from the hot coolant gallery, or to supply the EOC inlet with the coolant from both the cold coolant gallery and the hot coolant gallery. The EOC control valve is also operable to close fluid communication between the EOC inlet and both the cold coolant gallery and the hot coolant gallery. A Transmission Oil Cooler (TOC) includes a TOC inlet and a TOC outlet. The TOC inlet is disposed in fluid communication with each of the cold coolant gallery and the hot coolant gallery. The TOC outlet is disposed in fluid communication with the bypass loop. A TOC control valve interconnects the TOC inlet, the cold coolant gallery, and the hot coolant gallery. The TOC control valve is operable to supply the TOC inlet with the coolant from the cold coolant gallery, to supply the TOC inlet with the coolant from the hot coolant gallery, or to supply the TOC inlet with the coolant from both the cold coolant gallery and the hot coolant gallery. The TOC control valve is also operable to close fluid communication between the TOC inlet and both the cold coolant gallery and the hot coolant gallery. A Heating Core (HC) includes a HC inlet and a HC outlet. The HC inlet is disposed in fluid communication with the hot coolant gallery, and the HC outlet is disposed in fluid communication with the bypass loop. A HC control valve interconnects the HC inlet, and the hot coolant gallery. The HC control valve is operable to supply the HC inlet with the coolant from the hot coolant gallery, and is also operable to close fluid communication between the HC inlet and the hot coolant gallery. The method of controlling the thermal management system includes selecting a desired operating mode for transferring heat from at least one of the heat sources to at least one of the heat sinks. The heat sources include: the internal combustion engine, the cylinder head, the exhaust gas heat recovery system, the exhaust gas recirculation system, or the turbocharging system. The heat sinks include: the internal combustion engine, the cylinder heat, the engine oil cooler, the transmission oil cooler, and the heating core. Each of the EOC control valve, the TOC control valve, the HC control valve, the block control valve, the head control valve, the bypass control valve, and the heat transfer control valve are controlled to effectuate the selected operating mode and operate the thermal management system in the selected operating mode.

Accordingly, the thermal management system is capable of and may be controlled to supply heat from any one of the heat sources to any one of the heat sinks. In so doing, the heat may be captured and used to quickly heat the various components of the engine to their optimum operating temperature, such as the engine block, the cylinder head, the engine oil and/or the transmission oil. Additionally, the heat from any of the heat sources may be used for heating the passenger compartment. The fuel efficiency of the vehicle is improved by decreasing the time required to heat the components of the vehicle to their optimum operating temperatures. Additionally, decreasing the time required to heat the engine oil minimizes oil dilution, which allows for the size of the main bearing in for the crankshaft and rod bearings to be reduced, which in turn reduces the friction therebetween, thereby improving engine durability and fuel efficiency.

The above features and advantages and other features and advantages of the present teachings are readily apparent from the following detailed description of the best modes for carrying out the teachings when taken in connection with the accompanying drawings.

DETAILED DESCRIPTION

Figure 1:
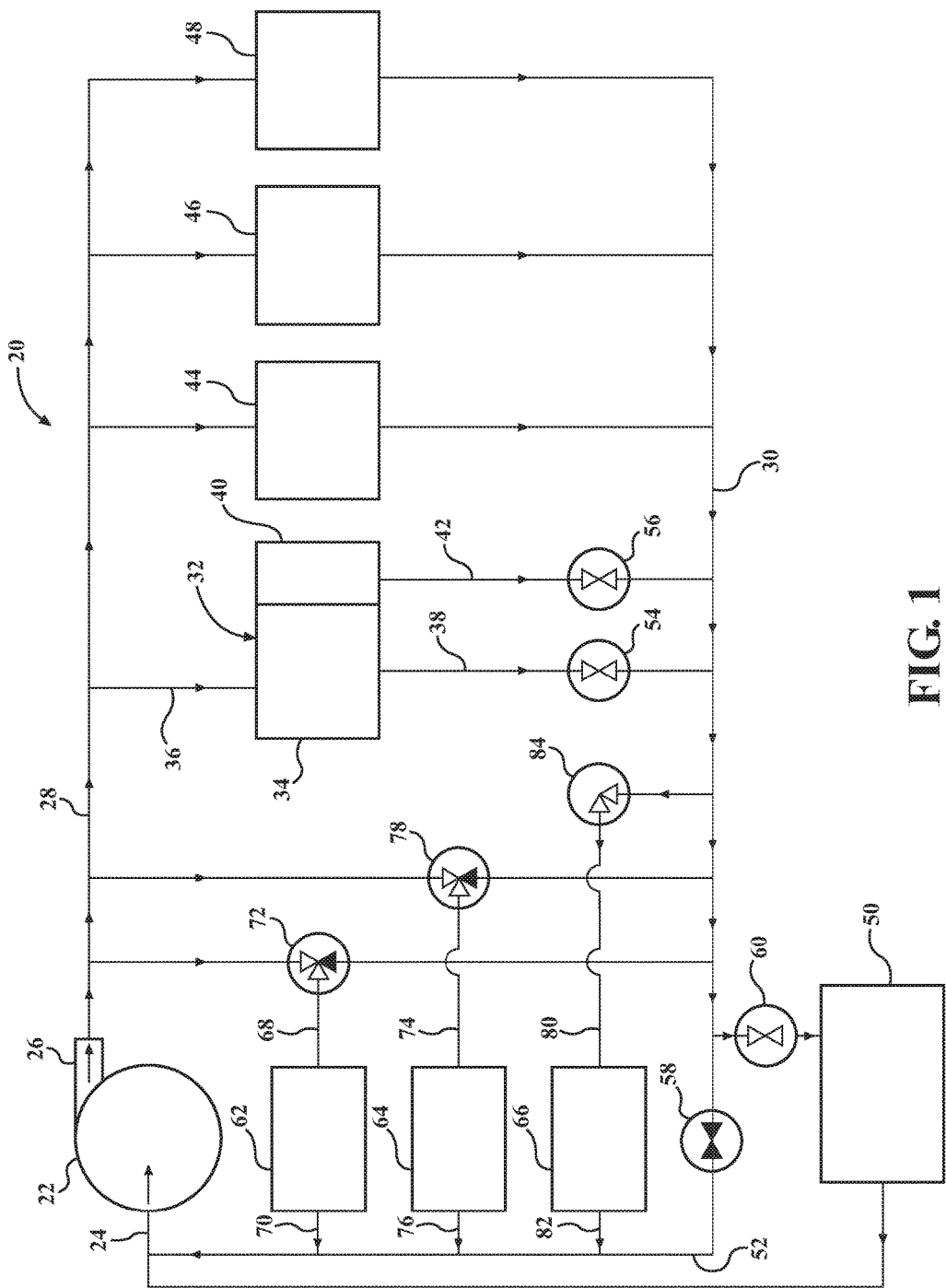
FIG. 1 is a schematic plan view of a thermal management system for a vehicle showing a normal operating mode.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a thermal management system 20 for a vehicle is generally shown at 20. The thermal management system 20 controls a fluid flow path/circuit of a coolant between various components and/or systems of the vehicle to control heat transfer between the various components and/or systems of the vehicle. The thermal management system 20 may be used to heat or cool the different components of the vehicle to obtain and control a temperature of the various components within optimum operating ranges.

Referring to the Figures, the thermal management system 20 includes a pump 22. The pump 22 circulates the coolant through the various hoses and/or pipes that make up the fluid circuits of the thermal management system 20, and between the various components of the thermal management system 20. The pump 22 may include any type and/or style of pump 22 suitable for use in a vehicle, and capable of circulating the coolant through the fluid circuit. The pump 22 may include, for example, a mechanically driven pump 22 that is powered by an engine of the vehicle, or an electric pump 22 that is powered by a battery of the vehicle. The pump 22 includes a pump inlet 24, and a pump outlet 26. The pump 22 receives the coolant through the pump inlet 24, and discharges the pressurized coolant through the pump outlet 26.

A cold coolant gallery 28 is disposed downstream of the pump 22. The cold coolant gallery 28 is disposed in fluid communication with the pump outlet 26 for receiving the circulated coolant from the pump 22. The cold coolant gallery 28 supplies and/or delivers cooled or lower temperature coolant to the various different components and/or systems of the thermal management system 20.

The thermal management system 20 includes at least one heat source that is disposed downstream of and in fluid communication with the cold coolant gallery 28. The heat source receives the circulated coolant from the cold coolant gallery 28. The heat source is operable to transfer heat to the coolant that circulates through the heat source. A hot coolant gallery 30 is disposed downstream of and in fluid communication with the at least one heat source. The hot coolant gallery 30 receives the heated coolant from the at least one heat source.

The at least one heat source may include an internal combustion engine 32 of the vehicle. The internal combustion engine 32 includes an engine block 34 having a block inlet 36 and a block outlet 38. The block inlet 36 is disposed in fluid communication with the cold coolant gallery 28 for receiving the coolant. The internal combustion engine 32 receives the coolant from the cold coolant gallery 28 through the block inlet 36. The block outlet 38 is disposed in fluid communication with the hot coolant gallery 30, and may supply heated coolant to the hot coolant gallery 30.

As shown, the internal combustion engine 32 includes a cylinder head 40. The cylinder head 40 may be defined as yet another one of the heat sources. The cylinder head 40 is disposed in fluid communication with the block inlet 36, and receives the coolant through the block inlet 36. The cylinder head 40 includes a head outlet 42 that is disposed in fluid communication with the hot coolant gallery 30. Accordingly, the cylinder head 40 may supply heated coolant to the hot coolant gallery 30. Even though the block outlet 38 and the head outlet 42 both receive the coolant through the block inlet 36, the head outlet 42 is separate and distinct from the block outlet 38.

The at least one heat source further includes at least one of an exhaust gas heat recovery system 44, an exhaust gas recirculation system 46, or a turbocharging system 48. As is known in the art, the exhaust gas heat recovery system 44 circulates the coolant through or around different components of the exhaust gas treatment system, such as an exhaust gas manifold, to absorb useable heat from the exhaust gas. The specific operation of the exhaust gas heat recovery system 44, other than the fact that the coolant absorbs heat from the exhaust gas heat recovery system 44, is not pertinent to the scope of the disclosure, and is therefore not described in detail herein. As is known in the art the exhaust gas recirculation system 46 circulates a portion of the exhaust gas back into an intake manifold to mix with the combustion air. The coolant may be circulated through the intake manifold to absorb heat from the exhaust gas, and/or cool the combustion air. The specific operation of the exhaust gas recirculation system 46, other than the fact that the coolant absorbs heat from the exhaust gas recirculation system 46, is not pertinent to the scope of the disclosure, and is therefore not described in detail herein. As is known in the art, the turbocharging system 48 compresses combustion air. A byproduct of compressing the combustion air is the generation of heat. The coolant may be circulated through the turbocharging system 48 to absorb excess heat and maintain the compressed air within a preferred temperature range. The specific operation of the turbocharging system 48, other than the fact that the coolant absorbs heat from the turbocharging system 48, is not pertinent to the scope of the disclosure, and is therefore not described in detail herein. It should be appreciated that the vehicle may include other heat sources that are not specifically described herein, which are connected in fluid communication with the fluid circuit of the coolant, and that are capable of supplying heat to the coolant.

The thermal management system 20 includes a heat exchanger 50, e.g., a radiator, which is disposed in fluid communication with the hot coolant gallery 30 and the pump inlet 24. The heat exchanger 50 receives heated coolant from the hot coolant gallery 30, and is operable to remove heat from the coolant as the coolant is circulated through the heat exchanger 50. The heat exchanger 50 is connected to the pump inlet 24 to supply the pump inlet 24 with the cooled coolant to complete the fluid circuit. The thermal management system 20 further includes a bypass loop 52. The bypass loop 52 interconnects the hot coolant gallery 30 and the pump inlet 24, and bypasses the heat exchanger 50. Accordingly, the coolant may flow through the bypass loop 52 instead of the heat exchanger 50 to complete the fluid circuit and supply the pump inlet 24 with the coolant.

A block control valve 54 interconnects the engine block 34 outlet and the hot coolant gallery 30. The block control valve 54 is operable to open fluid communication and close fluid communication between the engine block 34 outlet and the hot coolant gallery 30. The block control valve 54 may be referred to as a 1:1 valve, which connects one input with one output. The block control valve 54 may include an on/off valve that is moveable between a fully open position and a fully closed position. Preferably however, the block control valve 54 is a proportional valve. A proportional valve is defined herein as a valve that is capable of providing smooth and continuous variation in flow or pressure, between a fully open position and a fully closed position. Accordingly, a proportional valve may be positioned in a fully open position to allow maximum fluid flow through the valve, a fully closed position to completely prevent fluid flow through the valve, or at any number of intermediate positions to provide continuous variation in flow or pressure through the valve. It should be appreciated that if the block control valve 54 is a proportional valve, then the block control valve 54 is operable to meter or restrict fluid flow through the block control valve 54 to a desired flow or pressure rate.

A head control valve 56 interconnects the head outlet 42 and the hot coolant gallery 30. The head control valve 56 is operable to open fluid communication and close fluid communication between the head outlet 42 and the hot coolant gallery 30. The head control valve 56 may be referred to as a 1:1 valve, which connects one input with one output. The head control valve 56 may include an on/off valve that is moveable between a fully open position and a fully closed position. Preferably however, the head control valve 56 is a proportional valve, as described above. It should be appreciated that if the head control valve 56 is a proportional valve, then the head control valve 56 is operable to meter or restrict fluid flow through the head control valve 56 to a desired flow or pressure rate.

A bypass control valve 58 interconnects the hot coolant gallery 30 and the bypass loop 52. The bypass control valve 58 is operable to open fluid communication and close fluid communication between the hot coolant gallery 30 and the bypass loop 52. The bypass control valve 58 may be referred to as a 1:1 valve, which connects one input with one output. The bypass control valve 58 may include an on/off valve that is moveable between a fully open position and a fully closed position. Preferably however, the bypass control valve 58 is a proportional valve, as described above. It should be appreciated that if the bypass control valve 58 is a proportional valve, then the bypass control valve 58 is operable to meter or restrict fluid flow through the bypass control valve 58 to a desired flow or pressure rate.

A heat transfer control valve 60 interconnects the hot coolant gallery 30 and the heat exchanger 50. The heat transfer control valve 60 is operable to open fluid communication and close fluid communication between the hot coolant gallery 30 and the heat exchanger 50. The heat transfer control valve 60 may be referred to as a 1:1 valve, which connects one input with one output. Preferably, the heat transfer control valve 60 is an on/off valve that is moveable between a fully open position and a fully closed position. However, it should be appreciated that the heat transfer valve may alternatively include a proportional valve.

The thermal management system 20 includes a plurality of different heat sinks that may be selected to receive heat from the coolant. The heat sinks may include, for example, the engine block 34 and/or the cylinder head 40 of the internal combustion engine 32. As such, the engine block 34 and the cylinder head 40 may be either heat sources, or heat sinks, depending upon which operating mode the thermal management system 20 is configured to operate in. Additionally, the heat sinks may include an Engine oil cooler 62 (EOC), a Transmission oil cooler 64 (TOC), or a Heating core 66 (HC).

The engine oil cooler 62 includes an EOC inlet 68 and an EOC outlet 70. The EOC inlet 68 is disposed in fluid communication with each of the cold coolant gallery 28 and the hot coolant gallery 30. The EOC outlet 70 is disposed in fluid communication with the bypass loop 52. The engine oil cooler 62 may be used to either heat the engine oil if supplied with heated coolant from the hot coolant gallery 30, or may be used to cool the engine oil if supplied with the coolant from the cold coolant gallery 28.

An EOC control valve 72 interconnects the EOC inlet 68, the cold coolant gallery 28, and the hot coolant gallery 30. The EOC control valve 72 is operable to supply the EOC inlet 68 with the coolant from the cold coolant gallery 28, to supply the EOC inlet 68 with the coolant from the hot coolant gallery 30, or to supply the EOC inlet 68 with the coolant from both the cold coolant gallery 28 and the hot coolant gallery 30. Additionally, the EOC control valve 72 is operable to close fluid communication between the EOC inlet 68 and both the cold coolant gallery 28 and the hot coolant gallery 30. The EOC control valve 72 may be referred to as a 2:1 valve, which connects two inputs with one output. The EOC control valve 72 may include an on/off valve that is moveable between respective fully open positions and fully closed position, to allow maximum fluid flow or prevent fluid flow between the cold coolant gallery 28 and the TOC inlet 74, or between the hot coolant gallery 30 and the TOC inlet 74 respectively. Preferably however, the EOC control valve 72 is a proportional valve, as described above. It should be appreciated that if the EOC control valve 72 is a proportional valve, then the EOC control valve 72 is operable to meter or restrict fluid flow through the EOC control valve 72 to a desired flow or pressure rate. As such, fluid flow from the cold coolant gallery 28 and/or the hot coolant gallery 30 may be metered to a desired flow rate or pressure.

The transmission oil cooler 64 includes a TOC inlet 74 and a TOC outlet 76. The TOC inlet 74 is disposed in fluid communication with each of the cold coolant gallery 28 and the hot coolant gallery 30. The TOC outlet 76 is disposed in fluid communication with the bypass loop 52. The transmission oil cooler 64 may be used to either heat the transmission oil if supplied with heated coolant from the hot coolant gallery 30, or may be used to cool the engine oil if supplied with the coolant from the cold coolant gallery 28.

A TOC control valve 78 interconnects the TOC inlet 74, the cold coolant gallery 28, and the hot coolant gallery 30. The TOC control valve 78 is operable to supply the TOC inlet 74 with the coolant from the cold coolant gallery 28, to supply the TOC inlet 74 with the coolant from the hot coolant gallery 30, or to supply the TOC inlet 74 with the coolant from both the cold coolant gallery 28 and the hot coolant gallery 30. Additionally, the TOC control valve 78 is operable to close fluid communication between the TOC inlet 74 and both the cold coolant gallery 28 and the hot coolant gallery 30. The TOC control valve 78 may be referred to as a 2:1 valve, which connects two inputs with one output. The TOC control valve 78 may include an on/off valve that is moveable between respective fully open positions and fully closed position, to allow maximum fluid flow or prevent fluid flow between the cold coolant gallery 28 and the TOC inlet 74, or between the hot coolant gallery 30 and the TOC inlet 74 respectively. Preferably however, the TOC control valve 78 is a proportional valve, as described above. It should be appreciated that if the TOC control valve 78 is a proportional valve, then the TOC control valve 78 is operable to meter or restrict fluid flow through the TOC control valve 78 to a desired flow or pressure rate. As such, fluid flow from the cold coolant gallery 28 and/or the hot coolant gallery 30 may be metered to a desired flow rate or pressure.

The heating core 66 includes a HC inlet 80 and a HC outlet 82. The HC inlet 80 is disposed in fluid communication with the hot coolant gallery 30. The HC outlet 82 is disposed in fluid communication with the bypass loop 52. The heating core 66 is a heat exchanger 50 that is used to heat a passenger compartment of the vehicle, as is known in the art.

A HC control valve 84 interconnects the HC inlet 80 and the hot coolant gallery 30. The HC control valve 84 is operable to supply the HC inlet 80 with the coolant from the hot coolant gallery 30, and is operable to close fluid communication between the HC inlet 80 and the hot coolant gallery 30. The HC control valve 84 may be referred to as a 1:1 valve, which connects one input with one output. The HC control valve 84 may include an on/off valve that is moveable between a fully open position and a fully closed position. Preferably however, the HC control valve 84 is a proportional valve, as described above. It should be appreciated that if the HC control valve 84 is a proportional valve, then the HC control valve 84 is operable to meter or restrict fluid flow through the HC control valve 84 to a desired flow or pressure rate.

The thermal management system 20 described above may be controlled to operate in several different operating mode. The thermal management system 20 may include a control module that is used to automatically select the most advantages operating mode for the current operating conditions of the vehicle.

The control module may include a computer and/or processor, and include all software, hardware, memory, algorithms, connections, sensors, etc., necessary to manage and control the operation of the thermal management system 20 As such, a method, described below, may be embodied as a program or algorithm operable on the control module. It should be appreciated that the control module may include any device capable of analyzing data from various sensors, comparing data, making the necessary decisions required to control the operation of the thermal management system 20, and executing the required tasks necessary to control the operation of the thermal management system 20.

The control module may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory. The control module includes tangible, non-transitory memory on which are recorded computer-executable instructions. The processor of the control module is configured for executing the recorded computer-executable instructions.

The method of controlling the thermal management system 20 includes selecting a desired operating mode for transferring heat from at least one of the heat sources to at least one of the heat sinks. As noted above, the heat sources may include: the internal combustion engine 32, the cylinder head 40, the exhaust gas heat recovery system 44, the exhaust gas recirculation system 46, or the turbocharging system 48. The heat sinks may include: the internal combustion engine 32, the cylinder heat, the engine oil cooler 62, the transmission oil cooler 64, and the heating core 66.

Once the desired operating mode is selected, each of the EOC control valve 72, the TOC control valve 78, the HC control valve 84, the block control valve 54, the head control valve 56, the bypass control valve 58, and the heat transfer control valve 60 are controlled to a respective open or closed position to effectuate the selected operating mode and operate the thermal management system 20 in the selected operating mode. Within FIGS. 1 through 9, a solid triangle within each of the respective valves indicates that fluid flow between the connected fluid paths is closed, whereas an open or clear triangle within each respective valve indicates that fluid flow between the connected fluid paths is open.

Within FIGS. 1 through 9, fluid flow connections of the various valves are indicated by the fill state of the respective triangles connected to the lines connected to the various valves. A filled or solid triangle indicates a closed valve position preventing fluid connection with the respective line, whereas an open triangle indicates an open valve position allowing fluid flow between the connected fluid lines and connecting the respective connected fluid lines in fluid communication. Additionally, the general direction of flow of the coolant is shown in the various Figures by the flow arrows in the fluid lines connecting the various components of the thermal management system 20.

Referring to FIG. 1, the thermal management system 20 is shown configured for operation in a standard operating mode. As noted above, the engine oil cooler 62 and the transmission oil cooler 64 may be used to either heat or cool the engine oil and the transmission oil respectively. Once the engine oil and the transmission oil are heated to the optimum operating temperatures, then the engine oil and the transmission oil do not need to be heated, and will typically only need to be cooled. In order to cool the engine oil and/or the transmission oil respectively, the thermal management system 20 may be configured for operation in the standard operating mode, such as shown in FIG. 1.

As shown in FIG. 1, the pump 22 is operating to circulate the coolant through the thermal management system 20. The EOC control valve 72 is configured to open fluid communication between the cold coolant gallery 28 and the EOC inlet 68 to provide cooled coolant to the engine oil cooler 62, thereby allowing the engine oil cooler 62 to transfer heat from the engine oil to the coolant. Additionally, the TOC control valve 78 is configured to open fluid communication between the cold coolant gallery 28 and the TOC inlet 74 to provide cooled coolant to the transmission oil cooler 64, thereby allowing the transmission oil cooler 64 to transfer heat from the transmission oil to the coolant. It should be appreciated that the EOC control valve 72 and the TOC control valve 78 may each be a proportional valve, and the fluid flow rate through the EOC control valve 72 and the TOC control valve 78 may be regulated or metered to provide a desirable fluid flow rate through the engine oil cooler 62 and the transmission oil cooler 64 respectively.

As shown in FIG. 1, the HC control valve 84 is positioned to open fluid communication between the hot coolant gallery 30 and the heating core 66. However, the position of the HC control valve 84 is dependent upon the desired passenger compartment temperature, and may alternatively be positioned close fluid communication between the hot coolant gallery 30 and the heating core 66. Furthermore, it should be appreciated that the HC control valve 84 may be a proportional valve, and the fluid flow rate through the HC control valve 84 may be regulated or metered to provide a desirable fluid flow rate through the heating core 66.

Assuming that the engine block 34 and the cylinder head 40 are heated to the their respective optimum operating temperatures, and as shown in FIG. 1, the block control valve 54 and the head control valve 56 are positioned in their respective open positions to open fluid communication between the engine block 34 and hot coolant gallery 30, and between the cylinder head 40 and the hot coolant gallery 30 respectively, so that the temperature of the engine block 34 and the cylinder head 40 may be maintained within their respective optimum operating temperature range. It should be appreciated that the block control valve 54 and the head control valve 56 may include proportional valves that vary the fluid flow through block control valve 54 and the head control valve 56 as necessary to properly maintain the temperatures of the engine block 34 and the cylinder head 40.

The heat transfer control valve 60 is positioned to open fluid communication between the hot coolant gallery 30 and the heat exchanger 50, so that heat may be removed from the coolant circulating through the thermal management system 20. The bypass control valve 58 is positioned to close fluid communication between the hot coolant gallery 30 and the bypass loop 52 to force the coolant through heat exchanger 50.

Figure 2:
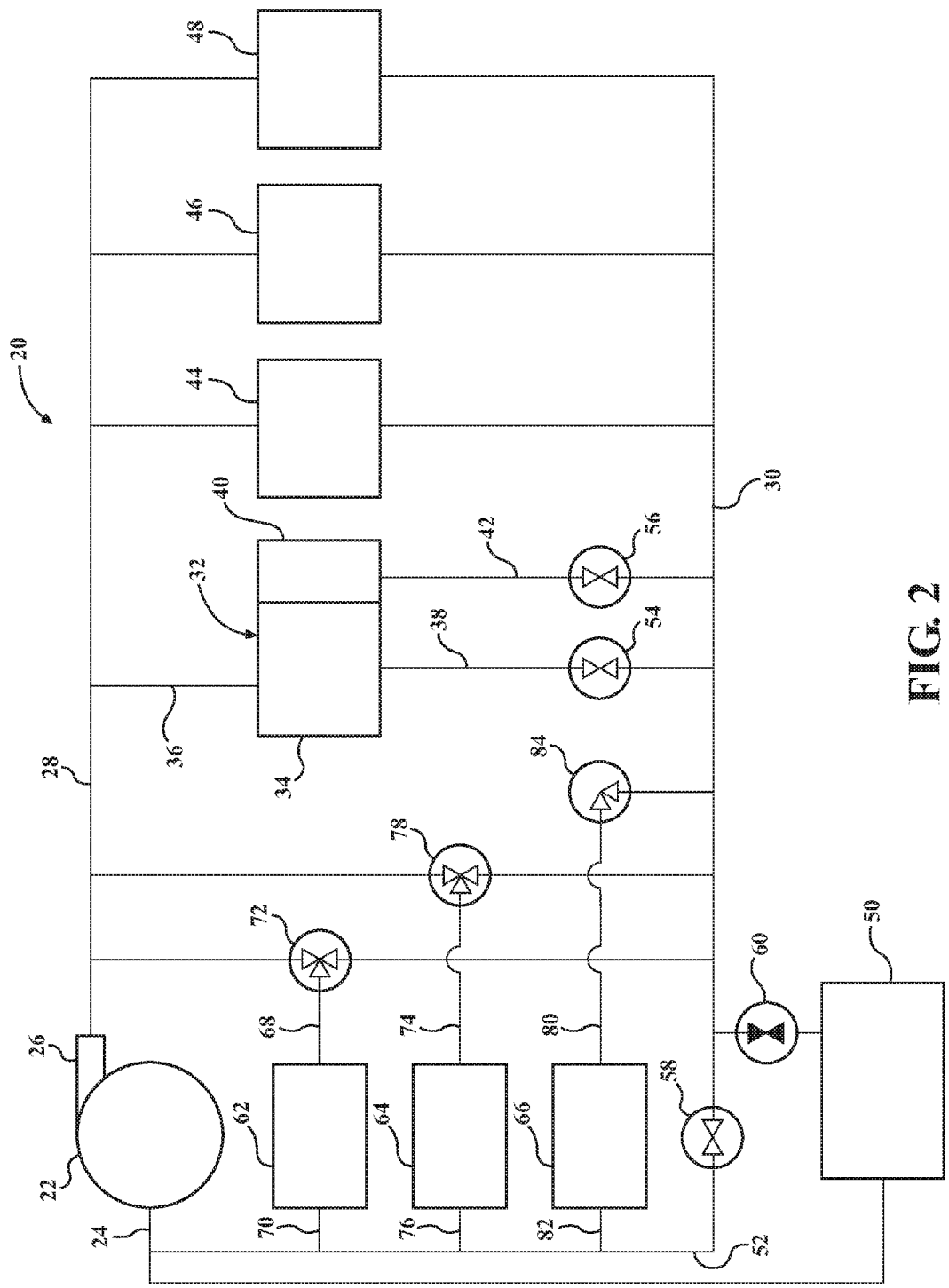
FIG. 2 is a schematic plan view of the thermal management system showing a zero flow mode.

Referring to FIG. 2, the thermal management system 20 is shown configured for operation in a zero flow mode. The zero flow mode may be used during the time between when the internal combustion engine 32 is first started and the time when the coolant reaches a temperature less than a boiling temperature of the coolant. During the zero flow mode, all of the heat generated is used to heat the thermal mass of the internal combustion engine 32, and no heat extraction to the heat exchanger 50.

As shown in FIG. 2, operating the thermal management system 20 in the zero flow mode includes deactivating the pump 22 so that the pump 22 does not circulate the coolant through the thermal management system 20, and closing the heat transfer control valve 60 to prevent the coolant from circulating through the heat exchanger 50 due to thermal syphoning. Because the pump 22 is deactivated, the pump 22 does not pressurize and/or circulate the coolant through the fluid circuit. As a result, all heat generated by the different systems of the vehicle stays trapped within those systems.

Figure 3:
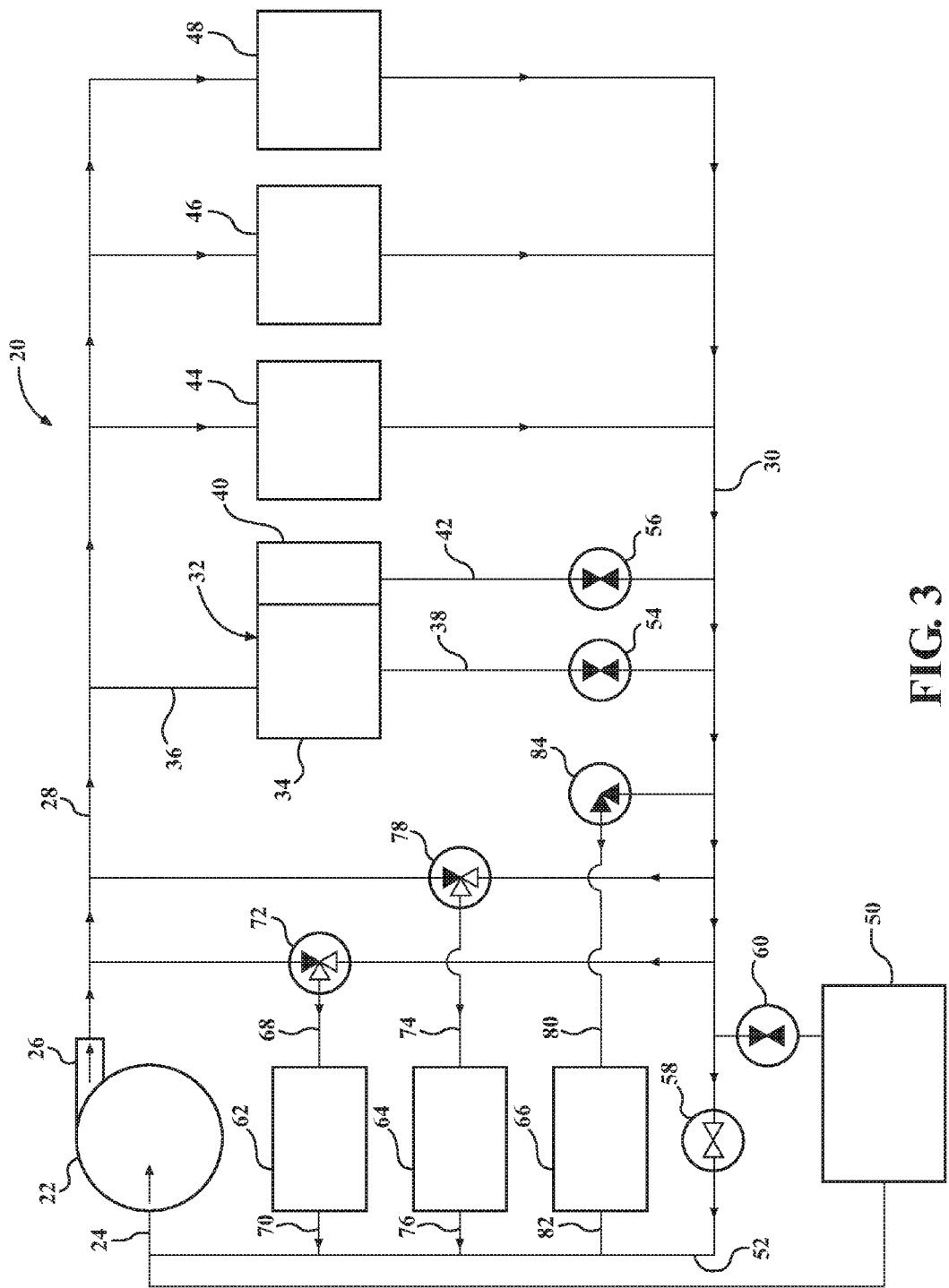
FIG. 3 is a schematic plan view of the thermal management system showing an engine warming mode.

Referring to FIG. 3, the thermal management system 20 is shown configured for operation in an engine warming mode. When operating in the engine warming mode, heat generated by the internal combustion engine 32, either in the engine block 34 or the cylinder head 40, is trapped or maintained within the internal combustion engine 32, thereby rapidly warming the internal combustion engine 32.

Operation of the thermal management system 20 in the engine warming mode includes activating the pump 22 to circulate the coolant through the thermal management system 20. The EOC control valve 72 is controlled to close fluid communication between the cold coolant gallery 28 and the engine oil cooler 62, and to open fluid communication between the hot coolant gallery 30 and the engine oil cooler 62 to provide heated coolant from the hot coolant gallery 30 to the engine oil cooler 62, thereby allowing the engine oil cooler 62 to transfer heat from the coolant to the engine oil. It should be appreciated that the EOC control valve 72 may be a proportional valve, and the fluid flow rate through the EOC control valve 72 may be regulated or metered to provide a desirable fluid flow rate through the engine oil cooler 62. Similarly, the TOC control valve 78 is controlled to close fluid communication between the cold coolant gallery 28 and the transmission oil cooler 64, and to open fluid communication between the hot coolant gallery 30 and the transmission oil cooler 64 to provide heated coolant from the hot coolant gallery 30 to the transmission oil cooler 64, thereby allowing the transmission oil cooler 64 to transfer heat from the coolant to the transmission oil. It should be appreciated that the TOC control valve 78 may be a proportional valve, and the fluid flow rate through the TOC control valve 78 may be regulated or metered to provide a desirable fluid flow rate through the transmission oil cooler 64. The HC control valve 84 is preferably controlled to close fluid communication between the hot coolant gallery 30 and the heating core 66. However, this may be overridden, and the HC control valve 84 positioned to open fluid communication between the heating core 66 and the hot coolant gallery 30 to provide the passenger cabin with heat as needed. It should be appreciated that the hot coolant gallery 30 is receiving heated coolant from the at least one of the heat sources, such as the exhaust gas heat recovery system 44, the exhaust gas recirculation system 46, and/or the turbocharging system 48.

Because the purpose of the engine warming mode is to heat the engine block 34 and the cylinder head 40 to optimum operating temperatures, the block control valve 54 is controlled to close fluid communication between the engine block 34 outlet and the hot coolant gallery 30. Similarly, the head control valve 56 is controlled to close fluid communication between the cylinder head 40 outlet and the hot coolant gallery 30. By closing the block control valve 54 and the head control valve 56, the coolant does not circulate through the engine block 34 and/or cylinder head 40. As such, heat generated within the engine block 34 and/or the cylinder head 40 remains within the engine block 34 and/or the cylinder head 40 respectively, thereby rapidly warming the engine block 34 and cylinder head 40.

In order to maintain as much heat as possible in the coolant, the heat transfer control valve 60 is controlled to close fluid communication between the hot coolant gallery 30 and the heat exchanger 50, thereby preventing the coolant from circulating through the heat exchanger 50 and being cooled. In order to complete the fluid circuit, the bypass control valve 58 is controlled to open fluid communication between the hot coolant gallery 30 and the bypass loop 52, thereby completing the fluid circuit with the pump 22. It should be appreciated that the bypass control valve 58 may be a proportional valve, and the fluid flow rate through the bypass control valve 58 may be regulated or metered to provide a desirable fluid flow rate through the fluid circuit.

Figure 4:
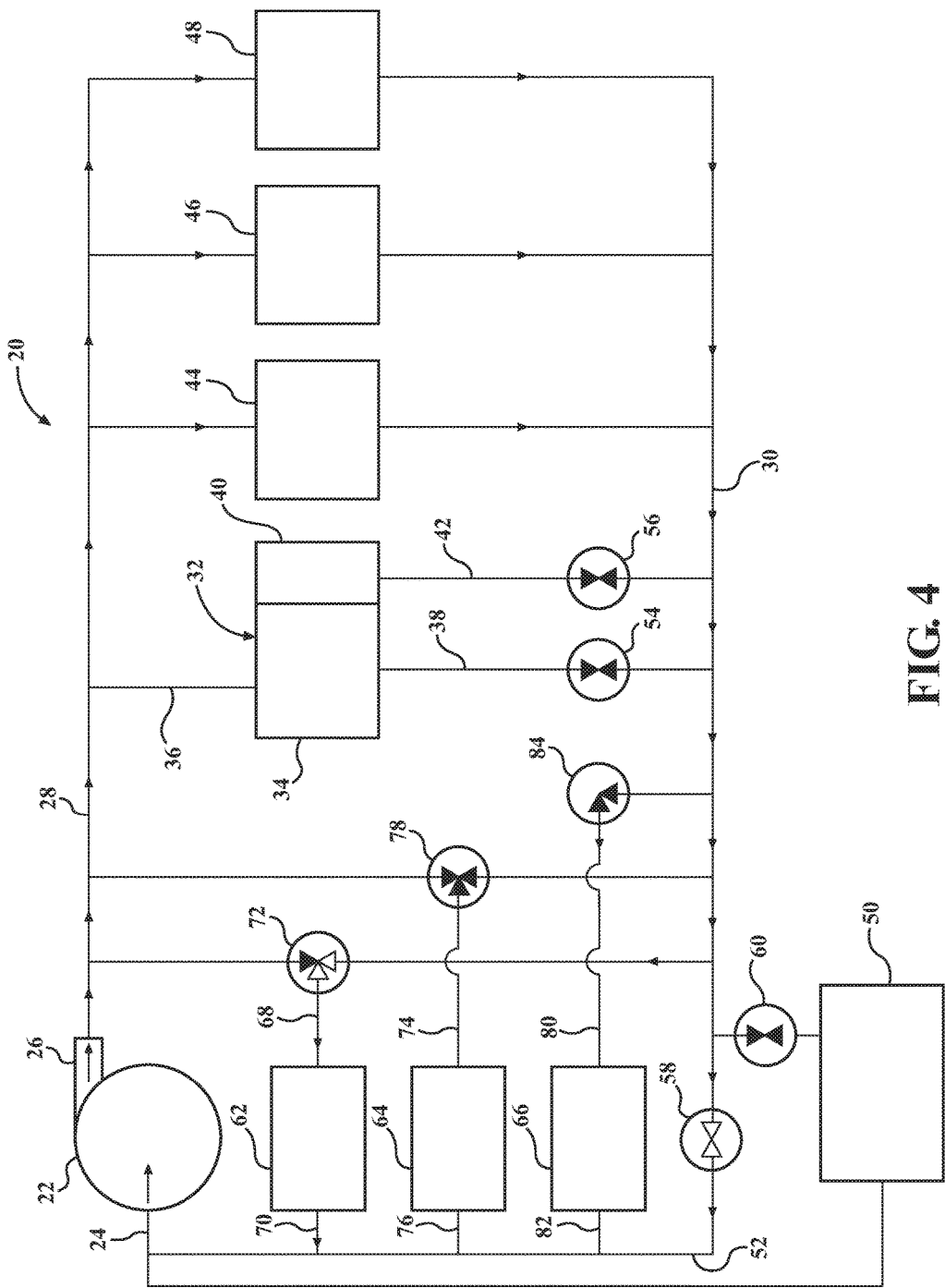
FIG. 4 is a schematic plan view of the thermal management system showing an engine oil warming mode.

Referring to FIG. 4, the thermal management system 20 is shown configured for operation in an engine oil warming mode. When operating in the engine oil warming mode, heat from at least one of the heat sources, such as the exhaust gas heat recovery system 44, the exhaust gas recirculation system 46, and/or the turbocharging system 48 is directed to the engine oil cooler 62 to heat the engine oil.

Operation of the thermal management system 20 in the engine oil warming mode includes activating the pump 22 to circulate the coolant through the thermal management system 20. The EOC control valve 72 is preferably controlled to close fluid communication between the cold coolant gallery 28 and the engine oil cooler 62, and to open fluid communication between the hot coolant gallery 30 and the engine oil cooler 62 to provide heated coolant from the hot coolant gallery 30 to the engine oil cooler 62, thereby allowing the engine oil cooler 62 to transfer heat from the coolant to the engine oil.

It should be appreciated that the EOC control valve 72 may be a proportional valve, and the fluid flow rate through the EOC control valve 72 may be regulated or metered to provide a desirable fluid flow rate through the fluid circuit, to achieve a desired amount or rate of heating. Furthermore, it should be appreciated that the EOC control valve 72 may simultaneously open fluid communication with the cold coolant gallery 28 and the hot coolant gallery 30 to provide a mixture or blend, to achieve the desired coolant temperature for heating the engine oil.

The TOC control valve 78 is controlled to close fluid communication between the cold coolant gallery 28 and the transmission oil cooler 64, and to close fluid communication between the hot coolant gallery 30 and the transmission oil cooler 64. The HC control valve 84 is preferably controlled to close fluid communication between the hot coolant gallery 30 and the heating core 66. However, this may be overridden, and the HC control valve 84 positioned to open fluid communication between the heating core 66 and the hot coolant gallery 30 to provide the passenger cabin with heat as needed. It should be appreciated that the hot coolant gallery 30 is receiving heated coolant from at least one of the heat sources, such as the exhaust gas heat recovery system 44, the exhaust gas recirculation system 46, and/or the turbocharging system 48.

Because the purpose of the engine oil warming mode is to heat the engine oil to an optimum operating temperature, the block control valve 54 is controlled to close fluid communication between the engine block 34 outlet and the hot coolant gallery 30. Similarly, the head control valve 56 is controlled to close fluid communication between the cylinder head 40 outlet and the hot coolant gallery 30. By closing the block control valve 54 and the head control valve 56, the coolant does not circulate through the engine block 34 and/or cylinder head 40. As such, heat generated within the engine block 34 and/or the cylinder head 40 remains within the engine block 34 and/or the cylinder head 40 respectively, thereby rapidly warming the engine block 34 and cylinder head 40, and the engine oil contained therein.

In order to transfer as much heat as possible to the engine oil cooler 62, the heat transfer control valve 60 is controlled to close fluid communication between the hot coolant gallery 30 and the heat exchanger 50, thereby preventing the coolant from circulating through the heat exchanger 50 and being cooled. In order to complete the fluid circuit, the bypass control valve 58 is controlled to open fluid communication between the hot coolant gallery 30 and the bypass loop 52, thereby completing the fluid circuit with the pump 22. It should be appreciated that the bypass control valve 58 may be a proportional valve, and the fluid flow rate through the bypass control valve 58 may be regulated or metered to provide a desirable fluid flow rate through the fluid circuit.

Figure 5:
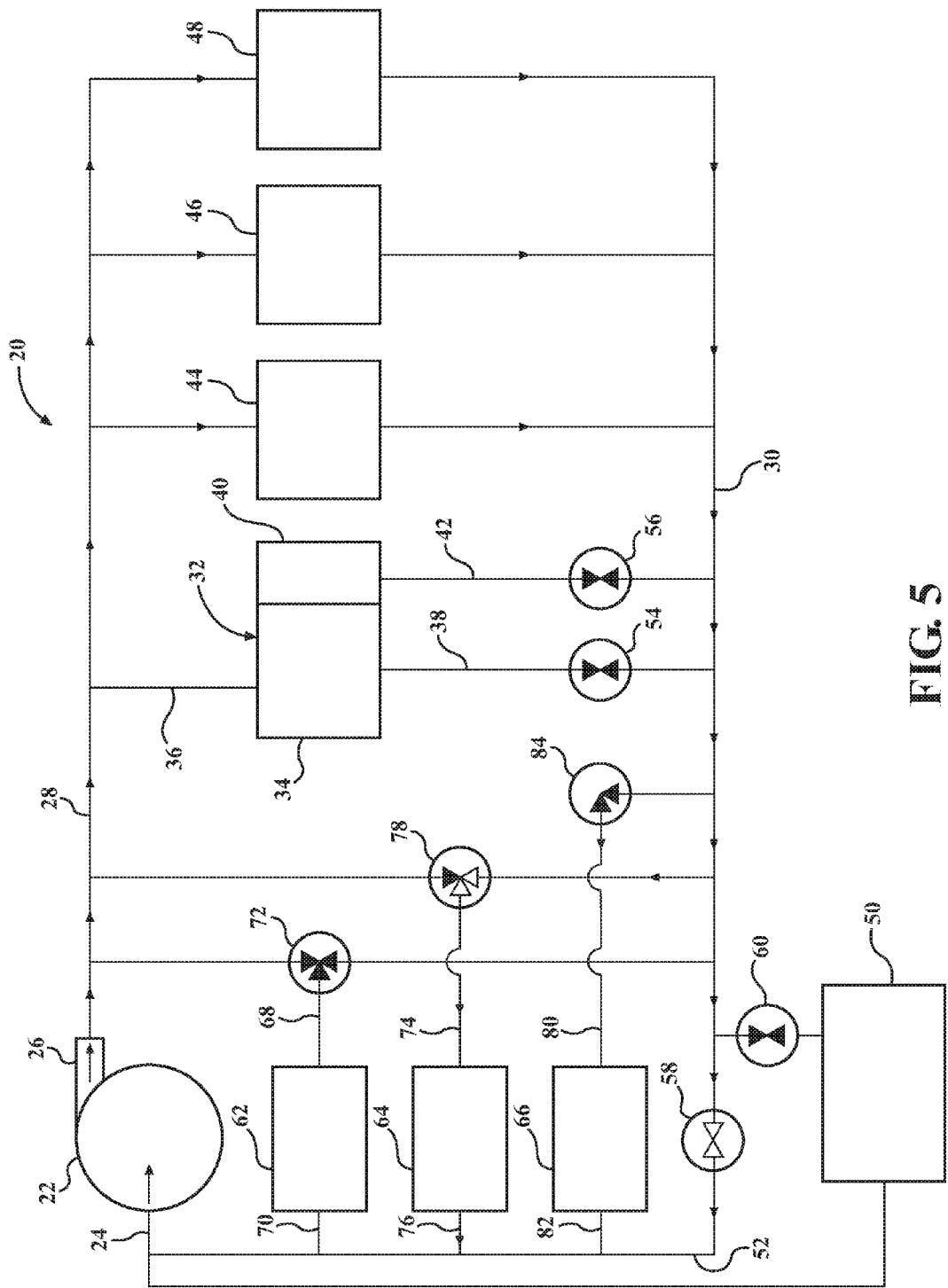
FIG. 5 is a schematic plan view of the thermal management system showing a transmission oil warming mode.

Referring to FIG. 5, the thermal management system 20 is shown configured for operation in a transmission oil warming mode. When operating in the transmission oil warming mode, heat from at least one of the heat sources, such as the exhaust gas heat recovery system 44, the exhaust gas recirculation system 46, and/or the turbocharging system 48 is directed to the transmission oil cooler 64 to heat the transmission oil.

Operation of the thermal management system 20 in the transmission oil warming mode includes activating the pump 22 to circulate the coolant through the thermal management system 20. The TOC control valve 78 is preferably controlled to close fluid communication between the cold coolant gallery 28 and the transmission oil cooler 64, and to open fluid communication between the hot coolant gallery 30 and the transmission oil cooler 64 to provide heated coolant from the hot coolant gallery 30 to the transmission oil cooler 64, thereby allowing the transmission oil cooler 64 to transfer heat from the coolant to the transmission oil.

It should be appreciated that the TOC control valve 78 may be a proportional valve, and the fluid flow rate through the TOC control valve 78 may be regulated or metered to provide a desirable fluid flow rate through the fluid circuit, to achieve a desired amount or rate of heating. Furthermore, it should be appreciated that the TOC control valve 78 may simultaneously open fluid communication with the cold coolant gallery 28 and the hot coolant gallery 30 to provide a mixture or blend of heated and cooled coolant, to achieve the desired coolant temperature for heating the transmission oil.

The EOC control valve 72 is controlled to close fluid communication between the cold coolant gallery 28 and the engine oil cooler 62, and to close fluid communication between the hot coolant gallery 30 and the engine oil cooler 62. The HC control valve 84 is preferably controlled to close fluid communication between the hot coolant gallery 30 and the heating core 66. However, this may be overridden, and the HC control valve 84 positioned to open fluid communication between the heating core 66 and the hot coolant gallery 30 to provide the passenger cabin with heat as needed. It should be appreciated that the hot coolant gallery 30 is receiving heated coolant from at least one of the heat sources, such as the exhaust gas heat recovery system 44, the exhaust gas recirculation system 46, and/or the turbocharging system 48.

Because the purpose of the transmission oil warming mode is to heat the transmission oil to an optimum operating temperature, the block control valve 54 is controlled to close fluid communication between the engine block 34 outlet and the hot coolant gallery 30. Similarly, the head control valve 56 is controlled to close fluid communication between the cylinder head 40 outlet and the hot coolant gallery 30. By closing the block control valve 54 and the head control valve 56, the coolant does not circulate through the engine block 34 and/or cylinder head 40. As such, heat generated within the engine block 34 and/or the cylinder head 40 remains within the engine block 34 and/or the cylinder head 40 respectively, thereby rapidly warming the engine block 34 and cylinder head 40.

In order to transfer as much heat as possible to the transmission oil cooler 64, the heat transfer control valve 60 is controlled to close fluid communication between the hot coolant gallery 30 and the heat exchanger 50, thereby preventing the coolant from circulating through the heat exchanger 50 and being cooled. In order to complete the fluid circuit, the bypass control valve 58 is controlled to open fluid communication between the hot coolant gallery 30 and the bypass loop 52, thereby completing the fluid circuit with the pump 22. It should be appreciated that the bypass control valve 58 may be a proportional valve, and the fluid flow rate through the bypass control valve 58 may be regulated or metered to provide a desirable fluid flow rate through the fluid circuit.

Figure 6:
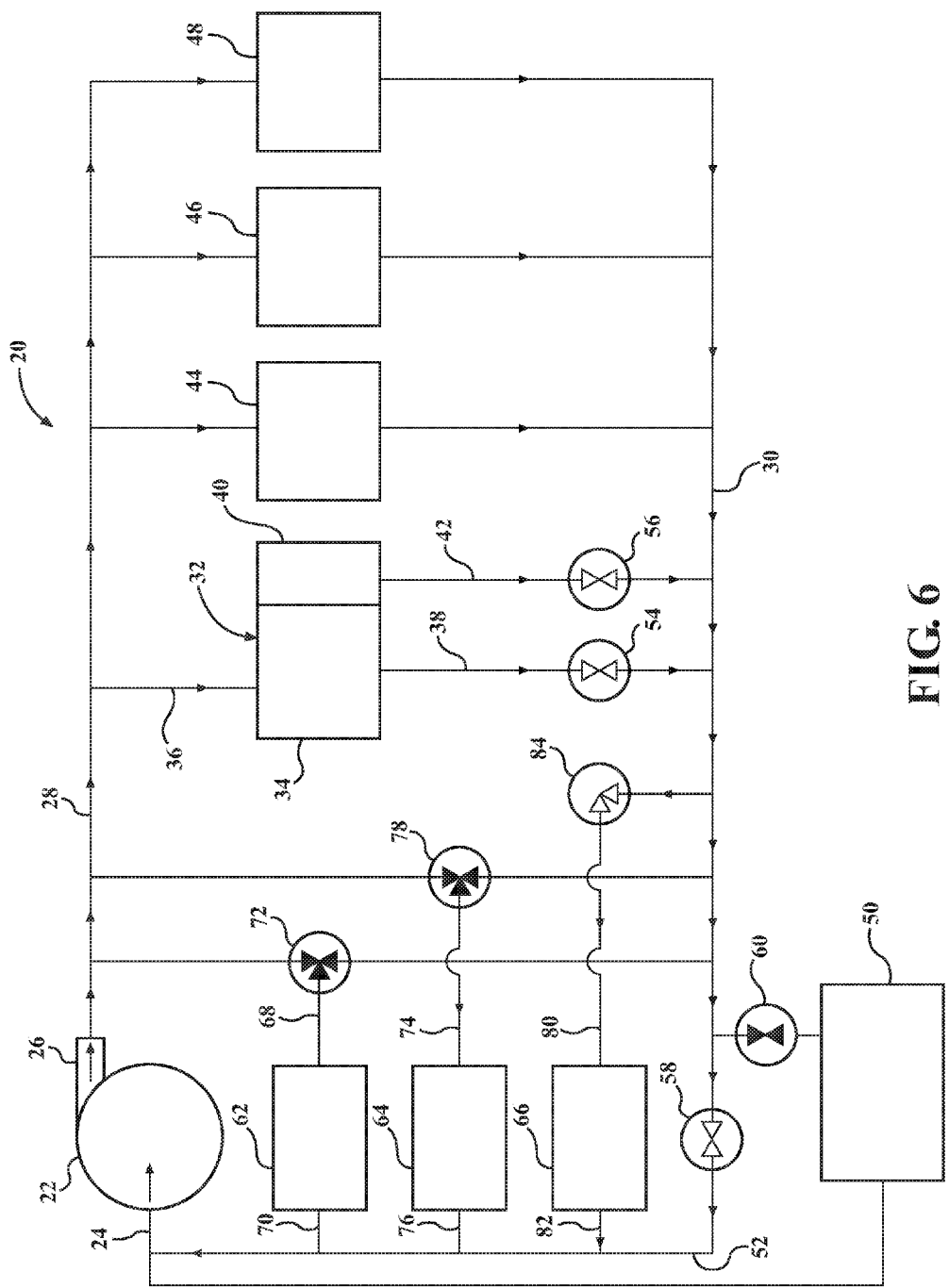
FIG. 6 is a schematic plan view of the thermal management system showing a passenger compartment heating mode.

Referring to FIG. 6, the thermal management system 20 is shown configured for operation in a passenger compartment heating mode. In order to provide as much heat as possible to satisfy the passenger compartment heating request, the thermal management system 20 may be configured for operation in the passenger compartment heating mode, such as shown in FIG. 6.

As shown in FIG. 6, the pump 22 is operating to circulate the coolant through the thermal management system 20. The EOC control valve 72 is preferably controlled to close fluid communication between the cold coolant gallery 28 and the engine oil cooler 62, and to close fluid communication between the hot coolant gallery 30 and the engine oil cooler 62. Similarly, the TOC control valve 78 is controlled to close fluid communication between the cold coolant gallery 28 and the transmission oil cooler 64, and to close fluid communication between the hot coolant gallery 30 and the transmission oil cooler 64. The HC control valve 84 is controlled to open fluid communication between the hot coolant gallery 30 and the heating core 66, thereby providing heated coolant to the heating core 66 to be used to heat the passenger compartment.

In order to provide as much heat to the hot coolant gallery 30 as possible, to provide as much heat as possible to the heating core 66, the block control valve 54 and the head control valve 56 are positioned in their respective open positions to open fluid communication between the engine block 34 and hot coolant gallery 30, and between the cylinder head 40 and the hot coolant gallery 30 respectively. It should be appreciated that the block control valve 54 and the head control valve 56 may include proportional valves that may vary the fluid flow through block control valve 54 and the head control valve 56 as necessary to properly maintain the temperatures of the engine block 34 and the cylinder head 40, as well as provide heat to the hot coolant gallery 30.

When the thermal management system 20 is operating in the passenger compartment heating mode, it should be appreciated that the hot coolant gallery 30 is receiving heated coolant from all of the heat sources, including the engine block 34, the cylinder head 40, the exhaust gas heat recovery system 44, the exhaust gas recirculation system 46, and the turbocharging system 48.

In order to provide maximum heat to the heating core 66, the heat transfer control valve 60 is controlled to close fluid communication between the hot coolant gallery 30 and the heat exchanger 50, thereby preventing the coolant from circulating through the heat exchanger 50 and being cooled. In order to complete the fluid circuit, the bypass control valve 58 is controlled to open fluid communication between the hot coolant gallery 30 and the bypass loop 52, thereby completing the fluid circuit with the pump 22. It should be appreciated that the bypass control valve 58 may be a proportional valve, and the fluid flow rate through the bypass control valve 58 may be regulated or metered to provide a desirable fluid flow rate through the fluid circuit.

Figure 7:
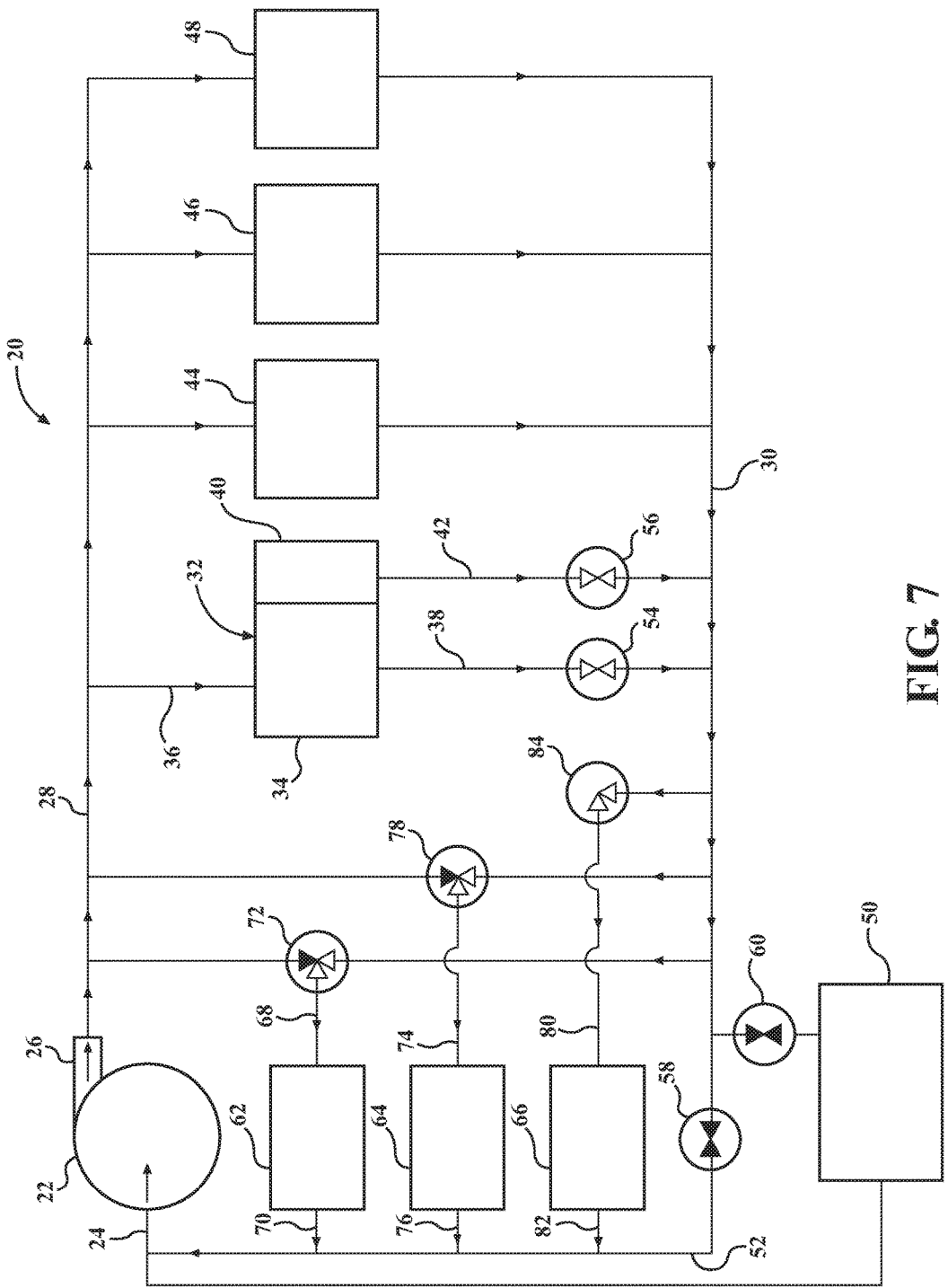
FIG. 7 is a schematic plan view of the thermal management system showing an all heat sinks active mode.

Referring to FIG. 7, the thermal management system 20 is shown configured for operation in an all heat sinks active mode. In order to provide as much heat as possible to all of the heat sinks of the vehicle, the thermal management system 20 may be configured for operation in the all heat sinks active mode, such as shown in FIG. 7.

As shown in FIG. 7, the pump 22 is operating to circulate the coolant through the thermal management system 20. The EOC control valve 72 is controlled to close fluid communication between the cold coolant gallery 28 and the engine oil cooler 62, and to open fluid communication between the hot coolant gallery 30 and the engine oil cooler 62 to provide heated coolant from the hot coolant gallery 30 to the engine oil cooler 62, thereby allowing the engine oil cooler 62 to transfer heat from the coolant to the engine oil. It should be appreciated that the EOC control valve 72 may be a proportional valve, and the fluid flow rate through the EOC control valve 72 may be regulated or metered to provide a desirable fluid flow rate through the engine oil cooler 62. Similarly, the TOC control valve 78 is controlled to close fluid communication between the cold coolant gallery 28 and the transmission oil cooler 64, and to open fluid communication between the hot coolant gallery 30 and the transmission oil cooler 64 to provide heated coolant from the hot coolant gallery 30 to the transmission oil cooler 64, thereby allowing the transmission oil cooler 64 to transfer heat from the coolant to the transmission oil. It should be appreciated that the TOC control valve 78 may be a proportional valve, and the fluid flow rate through the TOC control valve 78 may be regulated or metered to provide a desirable fluid flow rate through the transmission oil cooler 64. The HC control valve 84 is controlled to open fluid communication between the hot coolant gallery 30 and the heating core 66, thereby providing heated coolant to the heating core 66 to be used to heat the passenger compartment. It should be appreciated that the HC control valve 84 may be a proportional valve, and the fluid flow rate through the HC control valve 84 may be regulated or metered to provide a desirable fluid flow rate through the heating core 66.

In order to provide as much heat to the hot coolant gallery 30 as possible for the heat sinks of the vehicle, the block control valve 54 and the head control valve 56 are positioned in their respective open positions to open fluid communication between the engine block 34 and hot coolant gallery 30, and between the cylinder head 40 and the hot coolant gallery 30 respectively. It should be appreciated that the block control valve 54 and the head control valve 56 may include proportional valves that may vary the fluid flow through the block control valve 54 and the head control valve 56 as necessary to properly maintain the temperatures of the engine block 34 and the cylinder head 40, as well as provide heat to the hot coolant gallery 30.

When the thermal management system 20 is operating in the all heat sinks active mode, it should be appreciated that the hot coolant gallery 30 is receiving heated coolant from all of the heat sources, including the engine block 34, the cylinder head 40, the exhaust gas heat recovery system 44, the exhaust gas recirculation system 46, and the turbocharging system 48.

In order to provide maximum heat for the heat sinks, the heat transfer control valve 60 is controlled to close fluid communication between the hot coolant gallery 30 and the heat exchanger 50, thereby preventing the coolant from circulating through the heat exchanger 50 and being cooled. The bypass control valve 58 is controlled to close fluid communication between the hot coolant gallery 30 and the bypass loop 52, thereby forcing the coolant through the engine oil cooler 62, the transmission oil cooler 64, and the heating core 66 to complete the fluid circuit with the pump 22, and providing the maximum amount of heat to the respective heat sinks.

Figure 8:
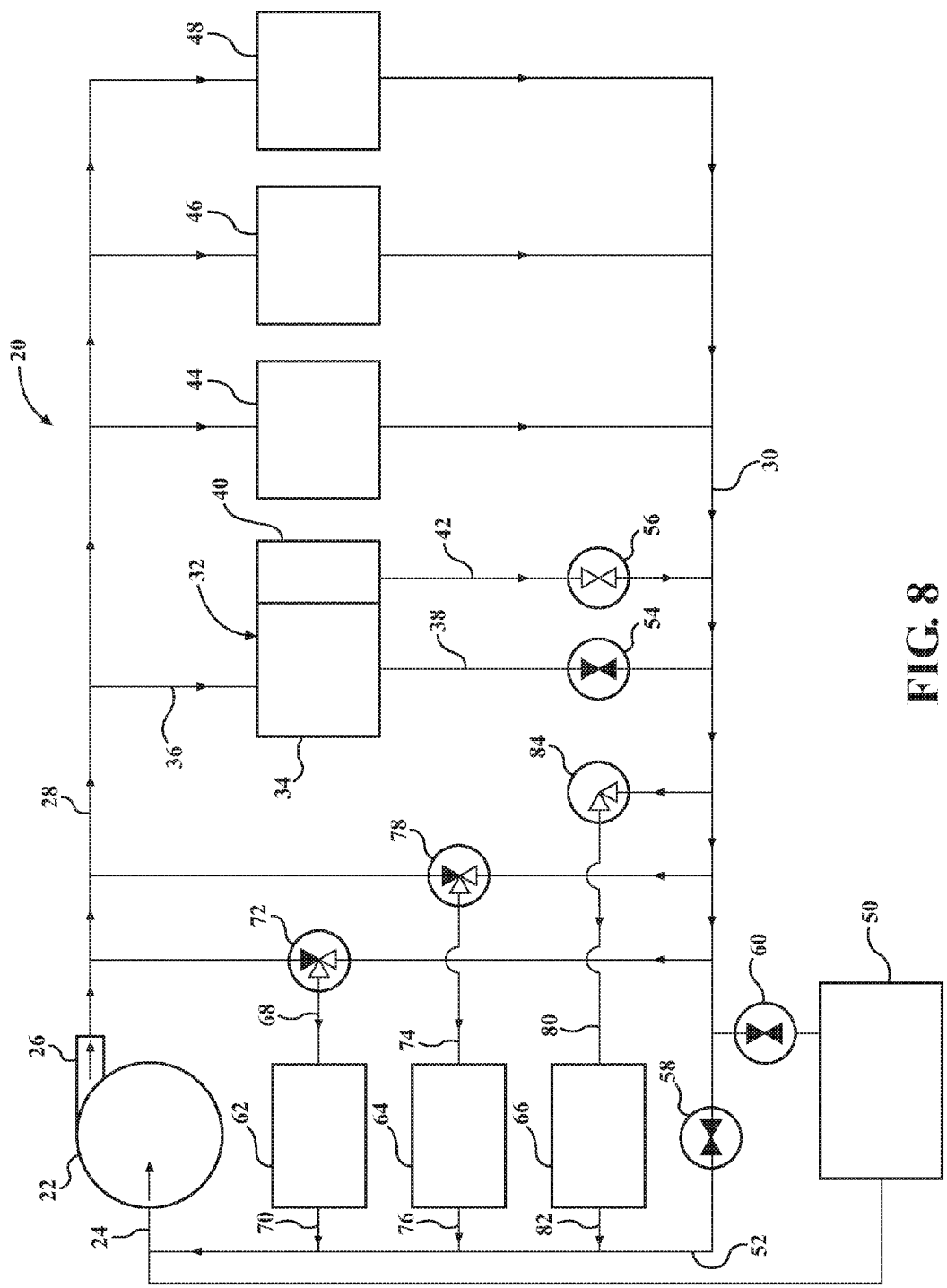
FIG. 8 is a schematic plan view of the thermal management system showing a split cooling mode.

Referring to FIG. 8, the thermal management system 20 is shown configured for operation in a split cooling mode. Upon the cylinder head 40 being heated to its optimum operating temperature, the cylinder head 40 may need to be cooled, whereas the engine block 34 has not yet reached its optimum operating temperature, and requires additional heating. In order to cool the cylinder head 40 and heat the engine block 34, the thermal management system 20 may be configured for operation in the split cooling mode, such as shown in FIG. 8.

As shown in FIG. 8, the pump 22 is operating to circulate the coolant through the thermal management system 20. The EOC control valve 72 is controlled to close fluid communication between the cold coolant gallery 28 and the engine oil cooler 62, and to open fluid communication between the hot coolant gallery 30 and the engine oil cooler 62 to provide heated coolant from the hot coolant gallery 30 to the engine oil cooler 62, thereby allowing the engine oil cooler 62 to transfer heat from the coolant to the engine oil. It should be appreciated that the EOC control valve 72 may be a proportional valve, and the fluid flow rate through the EOC control valve 72 may be regulated or metered to provide a desirable fluid flow rate through the engine oil cooler 62. Similarly, the TOC control valve 78 is controlled to close fluid communication between the cold coolant gallery 28 and the transmission oil cooler 64, and to open fluid communication between the hot coolant gallery 30 and the transmission oil cooler 64 to provide heated coolant from the hot coolant gallery 30 to the transmission oil cooler 64, thereby allowing the transmission oil cooler 64 to transfer heat from the coolant to the transmission oil. It should be appreciated that the TOC control valve 78 may be a proportional valve, and the fluid flow rate through the TOC control valve 78 may be regulated or metered to provide a desirable fluid flow rate through the transmission oil cooler 64. The HC control valve 84 is controlled to open fluid communication between the hot coolant gallery 30 and the heating core 66, thereby providing heated coolant to the heating core 66 to be used to heat the passenger compartment. It should be appreciated that the HC control valve 84 may be a proportional valve, and the fluid flow rate through the HC control valve 84 may be regulated or metered to provide a desirable fluid flow rate through the heating core 66.

In order to keep heat within the engine block 34, the block control valve 54 is controlled to close fluid communication between the engine block 34 and hot coolant gallery 30. In order to allow cooling of the cylinder head 40, the head control valve 56 is controlled to open fluid communication between the head outlet 42 and the hot coolant gallery 30, thereby allowing the coolant to circulate through the cylinder head 40 and cool the cylinder head 40. It should be appreciated that the head control valve 56 may include a proportional valve that may vary the fluid flow through the head control valve 56 as necessary to properly maintain the temperature of the cylinder head 40, as well as provide heat to the hot coolant gallery 30.

When the thermal management system 20 is operating in the split cooling mode, it should be appreciated that the hot coolant gallery 30 is receiving heated coolant from all of the heat sources except the engine block 34, including the cylinder head 40, the exhaust gas heat recovery system 44, the exhaust gas recirculation system 46, and the turbocharging system 48.

When the thermal management system 20 is operating in the split cooling mode, the heat transfer control valve 60 is controlled to close fluid communication between the hot coolant gallery 30 and the heat exchanger 50, thereby preventing the coolant from circulating through the heat exchanger 50 and being cooled. The bypass control valve 58 is controlled to close fluid communication between the hot coolant gallery 30 and the bypass loop 52, thereby forcing the coolant through the engine oil cooler 62, the transmission oil cooler 64, and the heating core 66 to complete the fluid circuit with the pump 22, and providing the maximum amount of heat to the respective heat sinks.

Figure 9:
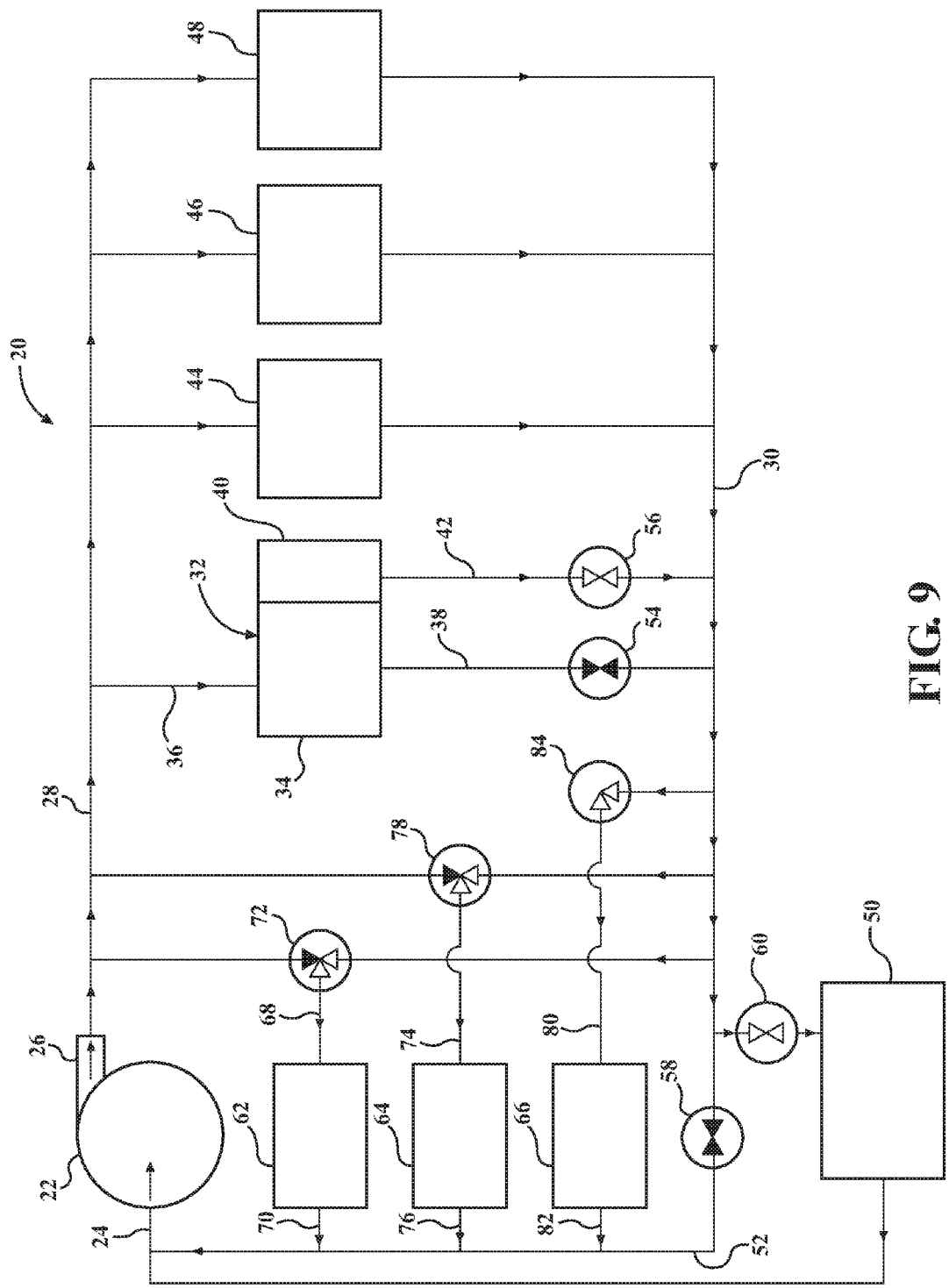
FIG. 9 is a schematic plan view of the thermal management system showing a maximum cooling mode.

Referring to FIG. 9, the thermal management system 20 is shown configured for operation in a maximum cooling mode. When operating in the maximum cooling mode, the pump 22 is operating to circulate the coolant through the thermal management system 20. The EOC control valve 72 is controlled to close fluid communication between the cold coolant gallery 28 and the engine oil cooler 62, and to open fluid communication between the hot coolant gallery 30 and the engine oil cooler 62 to provide heated coolant from the hot coolant gallery 30 to the engine oil cooler 62, thereby allowing the engine oil cooler 62 to transfer heat from the coolant to the engine oil. It should be appreciated that the EOC control valve 72 may be a proportional valve, and the fluid flow rate through the EOC control valve 72 may be regulated or metered to provide a desirable fluid flow rate through the engine oil cooler 62. Similarly, the TOC control valve 78 is controlled to close fluid communication between the cold coolant gallery 28 and the transmission oil cooler 64, and to open fluid communication between the hot coolant gallery 30 and the transmission oil cooler 64 to provide heated coolant from the hot coolant gallery 30 to the transmission oil cooler 64, thereby allowing the transmission oil cooler 64 to transfer heat from the coolant to the transmission oil. It should be appreciated that the TOC control valve 78 may be a proportional valve, and the fluid flow rate through the TOC control valve 78 may be regulated or metered to provide a desirable fluid flow rate through the transmission oil cooler 64. The HC control valve 84 is controlled to open fluid communication between the hot coolant gallery 30 and the heating core 66, thereby providing heated coolant to the heating core 66 to be used to heat the passenger compartment. It should be appreciated that the HC control valve 84 may be a proportional valve, and the fluid flow rate through the HC control valve 84 may be regulated or metered to provide a desirable fluid flow rate through the heating core 66.

As shown in FIG. 9, the block control valve 54 is controlled to close fluid communication between the engine block 34 and hot coolant gallery 30. In order to allow cooling of the cylinder head 40, the head control valve 56 is controlled to open fluid communication between the head outlet 42 and the hot coolant gallery 30, thereby allowing the coolant to circulate through the cylinder head 40 and cool the cylinder head 40. It should be appreciated that the head control valve 56 may include a proportional valve that may vary the fluid flow through the head control valve 56 as necessary to properly maintain the temperature of the cylinder head 40, as well as provide heat to the hot coolant gallery 30.

When the thermal management system 20 is operating in the maximum cooling mode, it should be appreciated that the hot coolant gallery 30 is receiving heated coolant from all of the heat sources except the engine block 34, including the cylinder head 40, the exhaust gas heat recovery system 44, the exhaust gas recirculation system 46, and the turbocharging system 48.

When the thermal management system 20 is operating in the maximum cooling mode, the heat transfer control valve 60 is controlled to open fluid communication between the hot coolant gallery 30 and the heat exchanger 50, thereby allowing the coolant to circulate through the heat exchanger 50 and be cooled. The bypass control valve 58 is controlled to close fluid communication between the hot coolant gallery 30 and the bypass loop 52, thereby forcing the coolant through the heat exchanger 50 to complete the fluid circuit with the pump 22.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A thermal management system for a vehicle, the thermal management system comprising:
   a pump having a pump inlet and a pump outlet, and operable to circulate a coolant;
   a cold coolant gallery disposed downstream of the pump and in fluid communication with the pump outlet for receiving the circulated coolant from the pump;
   at least one heat source disposed downstream of and in fluid communication with the cold coolant gallery for receiving the circulated coolant from the cold coolant gallery, wherein the at least one heat source is operable to transfer heat to the coolant circulating through the at least one heat source;
   a hot coolant gallery disposed downstream of and in fluid communication with the at least one heat source, and operable to receive the circulated coolant from the at least one heat source;
   a heat exchanger disposed in fluid communication with the hot coolant gallery and the pump inlet, and operable to remove heat from the coolant as the coolant is circulated through the heat exchanger;
   a bypass loop interconnecting the hot coolant gallery and the pump inlet, and bypassing the heat exchanger;
   an Engine Oil Cooler (EOC) having an EOC inlet and an EOC outlet, wherein the EOC inlet is disposed in fluid communication with each of the cold coolant gallery and the hot coolant gallery, and wherein the EOC outlet is disposed in fluid communication with the bypass loop;

an EOC control valve interconnecting the EOC inlet, the cold coolant gallery, and the hot coolant gallery, wherein the EOC control valve is operable to supply the EOC inlet with the coolant from the cold coolant gallery, to supply the EOC inlet with the coolant from the hot coolant gallery, to supply the EOC inlet with the coolant from both the cold coolant gallery and the hot coolant gallery, and is operable to close fluid communication between the EOC inlet and both the cold coolant gallery and the hot coolant gallery;

a Transmission Oil Cooler (TOC) having a TOC inlet and a TOC outlet, wherein the TOC inlet is disposed in fluid communication with each of the cold coolant gallery and the hot coolant gallery, and wherein the TOC outlet is disposed in fluid communication with the bypass loop;

a TOC control valve interconnecting the TOC inlet, the cold coolant gallery, and the hot coolant gallery, wherein the TOC control valve is operable to supply the TOC inlet with the coolant from the cold coolant gallery, to supply the TOC inlet with the coolant from the hot coolant gallery, to supply the TOC inlet with the coolant from both the cold coolant gallery and the hot coolant gallery, and is operable to prevent fluid communication between the TOC inlet and both the cold coolant gallery and the hot coolant gallery;

a Heating Core (HC) having a HC inlet and a HC outlet, wherein the HC inlet is disposed in fluid communication with the hot coolant gallery, and wherein the HC outlet is disposed in fluid communication with the bypass loop; and a HC control valve interconnecting the HC inlet and the hot coolant gallery, wherein the HC control valve is operable to supply the HC inlet with the coolant from the hot coolant gallery, and is operable to prevent fluid communication between the HC inlet and the hot coolant gallery.

2. The thermal management system set forth in claim 1 further comprising a bypass control valve interconnecting the hot coolant gallery and the bypass loop, wherein the bypass control valve is operable to open fluid communication and prevent fluid communication between the hot coolant gallery and the bypass loop.

3. The thermal management system set forth in claim 2 wherein the bypass control valve is a proportional valve operable to restrict fluid flow through the bypass control valve to a desired flow rate.

4. The thermal management system set forth in claim 2 further comprising a heat transfer control valve interconnecting the hot coolant gallery and the heat exchanger, wherein the heat transfer control valve is operable to open fluid communication and prevent fluid communication between the hot coolant gallery and the heat exchanger.

5. The thermal management system set forth in claim 4 wherein the at least one heat source includes an internal combustion engine having an engine block inlet and an engine block outlet, wherein the engine block inlet is disposed in fluid communication with the cold coolant gallery for receiving the coolant, and wherein the engine block outlet is disposed in fluid communication with the hot coolant gallery for supplying heated coolant to the hot coolant gallery.

6. The thermal management system set forth in claim 5 further comprising a block control valve interconnecting the engine block outlet and the hot coolant gallery, wherein the block control valve is operable to open fluid communication and close fluid communication between the engine block outlet and the hot coolant gallery.

7. The thermal management system set forth in claim 6 wherein the block control valve is a proportional valve operable to restrict fluid flow through the block control valve to a desired flow rate.

8. The thermal management system set forth in claim 6 wherein the internal combustion engine includes a cylinder head disposed in fluid communication with the engine block inlet, and having a head outlet disposed in fluid communication with the hot coolant gallery, wherein the at least one heat source includes the cylinder head.

9. The thermal management system set forth in claim 8 further comprising a head control valve interconnecting the head outlet and the hot coolant gallery, wherein the head control valve is operable to open fluid communication and close fluid communication between the head outlet and the hot coolant gallery.

10. The thermal management system set forth in claim 9 wherein the head control valve is a proportional valve operable to restrict fluid flow through the head control valve to a desired flow rate.

11. The thermal management system set forth in claim 9 wherein the at least one heat source includes at least one of an exhaust gas heat recovery system, an exhaust gas recirculation system, or a turbocharging system.

12. A method of controlling a thermal management system of a vehicle, the thermal management system including:
 a pump having a pump inlet and a pump outlet, and operable to circulate a coolant through the thermal management system;
 a cold coolant gallery disposed downstream of the pump and in fluid communication with the pump outlet for receiving the circulated coolant from the pump;
 at least one heat source disposed downstream of and in fluid communication with the cold coolant gallery for receiving the circulated coolant from the cold coolant gallery, wherein the at least one heat source is operable to transfer heat to the coolant circulating therethrough;
 a hot coolant gallery disposed downstream of and in fluid communication with the at least one heat source, and operable to receive the circulated coolant from the at least one heat source;
 wherein the at least one heat source includes an internal combustion engine, a cylinder head attached to the internal combustion engine, and at least one of an exhaust gas heat recovery system, an exhaust gas recirculation system, or a turbocharging system;
 wherein the engine block includes an engine block inlet and an engine block outlet, with the engine block inlet disposed in fluid communication with the cold coolant gallery for receiving the coolant, and with the engine block outlet disposed in fluid communication with the hot coolant gallery for supplying heated coolant to the hot coolant gallery;
 a block control valve interconnecting the engine block outlet and the hot coolant gallery, wherein the block control valve is operable to open fluid communication and close fluid communication between the engine block outlet and the hot coolant gallery;

wherein the cylinder head is disposed in fluid communication with the engine block inlet, and includes a head outlet disposed in fluid communication with the hot coolant gallery;
a head control valve interconnecting the head outlet and the hot coolant gallery, wherein the head control valve is operable to open fluid communication and close fluid communication between the head outlet and the hot coolant gallery;
a heat exchanger disposed in fluid communication with the hot coolant gallery and the pump inlet, and operable to remove heat from the coolant as the coolant is circulated through the heat exchanger;
a heat transfer control valve interconnecting the hot coolant gallery and the heat exchanger, wherein the heat transfer control valve is operable to open fluid communication and close fluid communication between the hot coolant gallery and the heat exchanger;
a bypass loop interconnecting the hot coolant gallery and the pump inlet, and bypassing the heat exchanger;
a bypass control valve interconnecting the hot coolant gallery and the bypass loop, wherein the bypass control valve is operable to open fluid communication and close fluid communication between the hot coolant gallery and the bypass loop;
an Engine Oil Cooler (EOC) having an EOC inlet and an EOC outlet, wherein the EOC inlet is disposed in fluid communication with each of the cold coolant gallery and the hot coolant gallery, and wherein the EOC outlet is disposed in fluid communication with the bypass loop;
an EOC control valve interconnecting the EOC inlet, the cold coolant gallery, and the hot coolant gallery, wherein the EOC control valve is operable to supply the EOC inlet with the coolant from the cold coolant gallery, to supply the EOC inlet with the coolant from the hot coolant gallery, to supply the EOC inlet with the coolant from both the cold coolant gallery and the hot coolant gallery, and is operable to close fluid communication between the EOC inlet and both the cold coolant gallery and the hot coolant gallery;
a Transmission Oil Cooler (TOC) having a TOC inlet and a TOC outlet, wherein the TOC inlet is disposed in fluid communication with each of the cold coolant gallery and the hot coolant gallery, and wherein the TOC outlet is disposed in fluid communication with the bypass loop;
a TOC control valve interconnecting the TOC inlet, the cold coolant gallery, and the hot coolant gallery, wherein the TOC control valve is operable to supply the TOC inlet with the coolant from the cold coolant gallery, to supply the TOC inlet with the coolant from the hot coolant gallery, to supply the TOC inlet with the coolant from both the cold coolant gallery and the hot coolant gallery, and is operable to close fluid communication between the TOC inlet and both the cold coolant gallery and the hot coolant gallery;
a Heating Core (HC) having a HC inlet and a HC outlet, wherein the HC inlet is disposed in fluid communication with the hot coolant gallery, and wherein the HC outlet is disposed in fluid communication with the bypass loop; and
a HC control valve interconnecting the HC inlet, and the hot coolant gallery, wherein the HC control valve is operable to supply the HC inlet with the coolant from the hot coolant gallery, and is operable to close fluid communication between the HC inlet and the hot coolant gallery;
the method comprising:
selecting a desired operating mode for transferring heat from at least one of the heat sources to at least one of the heat sinks, wherein the heat sources include: the internal combustion engine, the cylinder head, the exhaust gas heat recovery system, the exhaust gas recirculation system, or the turbocharging system, and wherein the heat sinks include: the internal combustion engine, the cylinder heat, the engine oil cooler, the transmission oil cooler, and the heating core;
controlling each of the EOC control valve, the TOC control valve, the HC control valve, the block control valve, the head control valve, the bypass control valve, and the heat transfer control valve to effectuate the selected operating mode and operate the thermal management system in the selected operating mode.

13. The method set forth in claim 12 further comprising operating the thermal management system in a zero flow mode by:
deactivating the pump so that the pump does not circulate the coolant through the thermal management system; and
closing the heat transfer control valve to prevent the coolant from circulating through the heat exchanger.

14. The method set forth in claim 12 further comprising operating the thermal management system in an engine warming mode by:
activating the pump to circulate the coolant through the thermal management system;
controlling the EOC control valve to close fluid communication between the cold coolant gallery and the engine oil cooler, and to open fluid communication between the hot coolant gallery and the engine oil cooler;
controlling the TOC control valve to close fluid communication between the cold coolant gallery and the transmission oil cooler, and to close fluid communication between the hot coolant gallery and the transmission oil cooler;
controlling the HC control valve to close fluid communication between the hot coolant gallery and the heating core;
controlling the block control valve to close fluid communication between the engine block outlet and the hot coolant gallery;
controlling the head control valve to close fluid communication between the cylinder head outlet and the hot coolant gallery;
controlling the bypass control valve to open fluid communication between the hot coolant gallery and the bypass loop; and
controlling the heat transfer control valve to close the coolant from circulating through the heat exchanger.

15. The method set forth in claim 12 further comprising operating the thermal management system in an engine oil warming mode by:
activating the pump to circulate the coolant through the thermal management system;
controlling the EOC control valve to close fluid communication between the cold coolant gallery and the engine oil cooler, and to open fluid communication between the hot coolant gallery and the engine oil cooler;

controlling the TOC control valve to close fluid communication between the cold coolant gallery and the transmission oil cooler, and to close fluid communication between the hot coolant gallery and the transmission oil cooler;
controlling the HC control valve to close fluid communication between the hot coolant gallery and the heating core;
controlling the block control valve to close fluid communication between the engine block outlet and the hot coolant gallery;
controlling the head control valve to close fluid communication between the cylinder head outlet and the hot coolant gallery;
controlling the bypass control valve to open fluid communication between the hot coolant gallery and the bypass loop; and
controlling the heat transfer control valve to close the coolant from circulating through the heat exchanger.

16. The method set forth in claim 12 further comprising operating the thermal management system in a transmission oil warming mode by:
activating the pump to circulate the coolant through the thermal management system;
controlling the EOC control valve to close fluid communication between the cold coolant gallery and the engine oil cooler, and to close fluid communication between the hot coolant gallery and the engine oil cooler;
controlling the TOC control valve to close fluid communication between the cold coolant gallery and the transmission oil cooler, and to open fluid communication between the hot coolant gallery and the transmission oil cooler;
controlling the HC control valve to close fluid communication between the hot coolant gallery and the heating core;
controlling the block control valve to close fluid communication between the engine block outlet and the hot coolant gallery;
controlling the head control valve to close fluid communication between the cylinder head outlet and the hot coolant gallery;
controlling the bypass control valve to open fluid communication between the hot coolant gallery and the bypass loop; and
controlling the heat transfer control valve to close the coolant from circulating through the heat exchanger.

17. The method set forth in claim 12 further comprising operating the thermal management system in a passenger compartment heating mode by:
activating the pump to circulate the coolant through the thermal management system;
controlling the EOC control valve to close fluid communication between the cold coolant gallery and the engine oil cooler, and to close fluid communication between the hot coolant gallery and the engine oil cooler;
controlling the TOC control valve to close fluid communication between the cold coolant gallery and the transmission oil cooler, and to close fluid communication between the hot coolant gallery and the transmission oil cooler;
controlling the HC control valve to open fluid communication between the hot coolant gallery and the heating core;
controlling the block control valve to open fluid communication between the engine block outlet and the hot coolant gallery;
controlling the head control valve to open fluid communication between the cylinder head outlet and the hot coolant gallery;
controlling the bypass control valve to open fluid communication between the hot coolant gallery and the bypass loop; and
controlling the heat transfer control valve to close the coolant from circulating through the heat exchanger.

18. The method set forth in claim 12 further comprising operating the thermal management system in an all heat sinks active mode by:
activating the pump to circulate the coolant through the thermal management system
controlling the EOC control valve to close fluid communication between the cold coolant gallery and the engine oil cooler, and to open fluid communication between the hot coolant gallery and the engine oil cooler;
controlling the TOC control valve to close fluid communication between the cold coolant gallery and the transmission oil cooler, and to open fluid communication between the hot coolant gallery and the transmission oil cooler;
controlling the HC control valve to open fluid communication between the hot coolant gallery and the heating core;
controlling the block control valve to open fluid communication between the engine block outlet and the hot coolant gallery;
controlling the head control valve to open fluid communication between the cylinder head outlet and the hot coolant gallery;
controlling the bypass control valve to close fluid communication between the hot coolant gallery and the bypass loop; and
controlling the heat transfer control valve to close the coolant from circulating through the heat exchanger.

19. The method set forth in claim 12 further comprising operating the thermal management system in a split cooling mode by:
activating the pump to circulate the coolant through the thermal management system;
controlling the EOC control valve to close fluid communication between the cold coolant gallery and the engine oil cooler, and to open fluid communication between the hot coolant gallery and the engine oil cooler;
controlling the TOC control valve to close fluid communication between the cold coolant gallery and the transmission oil cooler, and to open fluid communication between the hot coolant gallery and the transmission oil cooler;
controlling the HC control valve to open fluid communication between the hot coolant gallery and the heating core;
controlling the block control valve to close fluid communication between the engine block outlet and the hot coolant gallery;
controlling the head control valve to open fluid communication between the cylinder head outlet and the hot coolant gallery;
controlling the bypass control valve to close fluid communication between the hot coolant gallery and the bypass loop; and controlling the heat transfer control valve to close the coolant from circulating through the heat exchanger.

20. The method set forth in claim 12 further comprising operating the thermal management system in a maximum cooling mode by:

activating the pump to circulate the coolant through the thermal management system;

controlling the EOC control valve to close fluid communication between the cold coolant gallery and the engine oil cooler, and to open fluid communication between the hot coolant gallery and the engine oil cooler;

controlling the TOC control valve to close fluid communication between the cold coolant gallery and the transmission oil cooler, and to open fluid communication between the hot coolant gallery and the transmission oil cooler;

controlling the HC control valve to open fluid communication between the hot coolant gallery and the heating core;

controlling the block control valve to close fluid communication between the engine block outlet and the hot coolant gallery;

controlling the head control valve to open fluid communication between the cylinder head outlet and the hot coolant gallery;

controlling the bypass control valve to close fluid communication between the hot coolant gallery and the bypass loop; and controlling the heat transfer control valve to open the coolant from circulating through the heat exchanger.

* * * * *